United States Patent
Sohangir

(10) Patent No.: US 10,748,207 B2
(45) Date of Patent: Aug. 18, 2020

(54) PATTERN BASED APPAREL SEARCH ENGINE AND RECOMMENDATION

(71) Applicant: Sina Sohangir, Los Angeles, CA (US)

(72) Inventor: Sina Sohangir, Los Angeles, CA (US)

( * ) Notice: Subject to any disclaimer, the term of this patent is extended or adjusted under 35 U.S.C. 154(b) by 251 days.

(21) Appl. No.: 15/942,253

(22) Filed: Mar. 30, 2018

(65) Prior Publication Data
US 2018/0330430 A1 Nov. 15, 2018

Related U.S. Application Data

(60) Provisional application No. 62/480,140, filed on Mar. 31, 2017.

(51) Int. Cl.
| | |
|---|---|
| *G06Q 30/00* | (2012.01) |
| *G06Q 30/06* | (2012.01) |
| *G06T 11/60* | (2006.01) |
| *G06F 16/248* | (2019.01) |
| *G06F 16/583* | (2019.01) |
| *G06F 16/9535* | (2019.01) |
| *G06T 11/00* | (2006.01) |
| *G06T 7/33* | (2017.01) |
| *G06T 7/50* | (2017.01) |

(52) U.S. Cl.
CPC ....... *G06Q 30/0643* (2013.01); *G06F 16/248* (2019.01); *G06F 16/5838* (2019.01); *G06F 16/9535* (2019.01); *G06T 11/00* (2013.01); *G06T 11/60* (2013.01); *G06T 7/337* (2017.01); *G06T 7/50* (2017.01); *G06T 2210/16* (2013.01)

(58) Field of Classification Search
CPC .................................................. G06Q 30/0643
See application file for complete search history.

(56) References Cited

U.S. PATENT DOCUMENTS

| | | |
|---|---|---|
| 9,366,530 B2 | 6/2016 | Wilkinson |
| 2011/0295711 A1 | 12/2011 | Mazmanyan |

(Continued)

FOREIGN PATENT DOCUMENTS

WO  WO2012020919 A1  2/2012

OTHER PUBLICATIONS

Johanson, A., & Special to the, P. D. (Oct. 2, 2002). Cutting Edge scanning device sets the pattern for sewing clothing that really fits: [final edition]. The Plain Dealer Retrieved from https://search.proquest.com/docview/292156988?accountid=14753.*

(Continued)

*Primary Examiner* — Kathleen Palavecino
(74) *Attorney, Agent, or Firm* — Seyfarth Shaw LLP

(57) ABSTRACT

A method for searching for apparel online includes storing multiple apparel cut patterns and determining a distance between points of the multiple apparel cut patterns. The method also includes retrieving a reference apparel item cut pattern from the multiple apparel cut patterns based on user input corresponding to a reference apparel item. The method further includes identifying a search apparel cut pattern from the multiple apparel cut patterns based on the determined distance and generating an overlay of a visual representation of the search apparel cut pattern and corresponding to a visual representation of the reference apparel cut pattern. The method still further includes displaying the overlay and information of a search apparel item corresponding to the search apparel cut pattern.

18 Claims, 12 Drawing Sheets

(56) References Cited

U.S. PATENT DOCUMENTS

2013/0013477 A1 1/2013 Ortega
2014/0143096 A1* 5/2014 Stubert .................. G06T 11/00
705/26.63
2017/0330291 A1 11/2017 Cotto

OTHER PUBLICATIONS

Virtusize, www.virtusize.com, Apr. 2011, retrieval on May 31, 2018.

* cited by examiner

PATTERN BASED APPAREL SEARCH ENGINE AND RECOMMENDATION

CROSS-REFERENCE TO RELATED APPLICATION

The present application claims the benefit of U.S. Provisional Patent Application No. 62/480,140, filed on Mar. 31, 2017, and titled "PATTERN BASED SHOPPING FOR CLOTHING," the disclosure of which is expressly incorporated by reference herein in its entirety.

BACKGROUND

Field

Aspects of the present disclosure relate generally to online shopping for clothing, and more particularly to systems and methods for presenting a schematic version of a sewing pattern compared to a reference sewing pattern.

Background

Finding a correct apparel size may be difficult. Even when shopping in person, it is often hard to find the correct apparel size. In many cases, there is a lack of uniformity and consistency in sizing among manufacturers because the apparel industry does not have standards for measurements. For example, size 34×30 jeans (e.g., 34" waist and 30" inseam) from one manufacturer may have a different fit than size 34×30 jeans from another manufacturer. Items of the same size may have a different fit due to differences in their sewing patterns. Even a similar item, having a same sewing pattern, from the same manufacturer may have a different fit due to, for example, differences in fabric, fabric construction, and/or fabric color. Additionally, manufacturers may change a sewing pattern or fabric from one season to another. These changes may cause a wearable item with a same size to have a different fit from one season to another. Accordingly, due to the numerous reasons provided above, as well as other reasons, it is difficult to find a correct apparel size.

Online shopping has increased the difficulty in finding a correct apparel size due to the inability to physically try on apparel. Many shoppers choose not to shop for wearable items online because they cannot physically try on the apparel. Often, online shoppers are relegated to buying a previously purchased item that is known to have a correct fit, thereby limiting the online shopper's apparel selection.

It is desirable to improve an online shopping experience for shoppers to find better fitting apparel based on previously owned apparel.

SUMMARY

In one aspect of the present disclosure, a method of searching for apparel online based on a visual comparison of cut patterns is disclosed. The method includes storing multiple apparel cut patterns. The method also includes determining a distance between points of the multiple apparel cut patterns. The method further includes retrieving a reference apparel item cut pattern from the multiple apparel cut patterns based on user input corresponding to a reference apparel item. The method still further includes identifying a search apparel cut pattern from the multiple apparel cut patterns based on the determined distance. The method also includes generating an overlay of a visual representation of the search apparel cut pattern and corresponding to a visual representation of the reference apparel cut pattern. The method further includes displaying the overlay and information of a search apparel item corresponding to the search apparel cut pattern.

Another aspect of the present disclosure is directed to an apparatus including means for storing multiple apparel cut patterns. The apparatus also includes means for determining a distance between points of the multiple apparel cut patterns. The apparatus further includes means for retrieving a reference apparel item cut pattern from the multiple apparel cut patterns based on user input corresponding to a reference apparel item. The apparatus still further includes means for identifying a search apparel cut pattern from the multiple apparel cut patterns based on the determined distance. The apparatus also includes means for generating an overlay of a visual representation of the search apparel cut pattern and corresponding to a visual representation of the reference apparel cut pattern. The apparatus further includes means for displaying the overlay and information of a search apparel item corresponding to the search apparel cut pattern.

In another aspect of the present disclosure, a non-transitory computer-readable medium with non-transitory program code recorded thereon is disclosed. The program code is for searching for apparel online based on a visual comparison of cut patterns. The program code is executed by a processor and includes program code to store multiple apparel cut patterns. The program code also includes program code to determine a distance between points of the multiple apparel cut patterns. The program code further includes program code to retrieve a reference apparel item cut pattern from the multiple apparel cut patterns based on user input corresponding to a reference apparel item. The program code still further includes program code to identify a search apparel cut pattern from the multiple apparel cut patterns based on the determined distance. The program code also includes program code to generate an overlay of a visual representation of the search apparel cut pattern and corresponding to a visual representation of the reference apparel cut pattern. The program code further includes program code to display the overlay and information of a search apparel item corresponding to the search apparel cut pattern.

Another aspect of the present disclosure is directed to an apparatus for searching for apparel online based on a visual comparison of cut patterns. The apparatus having a memory and one or more processors coupled to the memory. The processor(s) is configured to store multiple apparel cut patterns. The processor(s) is also configured to determine a distance between points of the multiple apparel cut patterns. The processor(s) is further configured to retrieve a reference apparel item cut pattern from the multiple apparel cut patterns based on user input corresponding to a reference apparel item. The processor(s) still further configured to identify a search apparel cut pattern from the multiple apparel cut patterns based on the determined distance. The processor(s) is also configured to generate an overlay of a visual representation of the search apparel cut pattern and corresponding to a visual representation of the reference apparel cut pattern. The processor(s) is further configured to display the overlay and information of a search apparel item corresponding to the search apparel cut pattern.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Apparel items are distinguished based on size or measurements. For example, shirts may be distinguished based on size: small (S); medium (M); or large (L). As another example, pants may be distinguished based on measurements, such as waist and inseam measurements. In this example, a 34×30 pant has a 34" waist and a 30" inseam. When shopping for clothes, either online or at a store, the size and measurements are the only reference point for a shopper to determine whether an item will fit. Often, the shopper will select items with sizes and/or measurements that are similar to items the shopper owns or previously owned.

When shopping in a store, the shopper can try on different items to determine whether an item has a proper fit. Based on the virtual nature of online shopping, a shopper cannot try on clothes when shopping online. Thus, the shopper is limited to selecting clothes based only on the size and/or measurements. This leads to a higher rate of return for apparel purchased online in comparison to apparel purchased in-person, at a store. According to some studies, online return rates (e.g., 25-30%) are approximately ten times greater than store return rates (e.g., 2-3%). An improper fit is a reason for most of the returns. Thus, there is a need to improve online shopping so that shoppers find apparel with a proper fit, thereby reducing return rates.

Aspects of the present disclosure are directed to using a pattern based system to improve online shopping. When producing apparel, an apparel manufacturer generates a pattern for each apparel item. The pattern is a template from which the parts of an item (e.g., garment) are traced onto fabric. The fabric is then cut based on the traced pattern and sewn together to form the specific item. The pattern may be referred to as a sewing pattern.

Figure 1A:
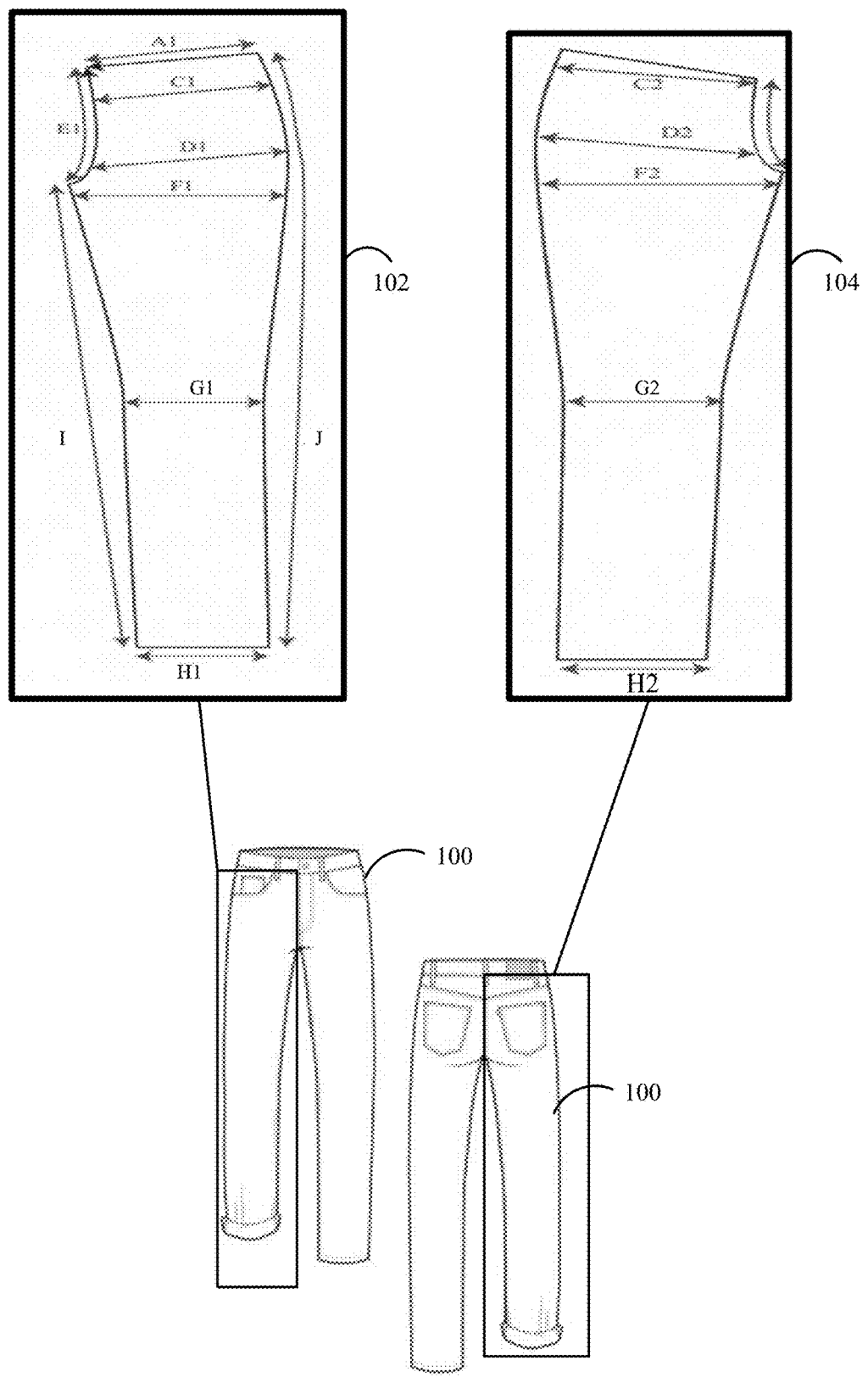
FIG. 1A illustrates an example of a cut pattern according to aspects of the present disclosure.

FIG. 1A illustrates an example of a pattern for pants 100. As shown in FIG. 1A, a pattern for pants 100 includes a front pattern 102 and a back pattern 104. The front pattern 102 and the back pattern 104 are for one pant leg. Fabric is cut according to the front pattern 102 and the back pattern 104. In this example, the cut fabric is sewn together to manufacture each leg of the pants 100. The pants 100 may also include patterns for pockets (e.g., front pocket, coin pocket, back pocket, etc.), waist (e.g., straight waist, contoured waist, etc.), zipper guard, and other elements. For brevity, the other patterns are not shown in FIG. 1A. FIG. 1A is not to scale and is for illustrative purposes.

In some cases, the fabric is cut by hand according to a pattern that has been traced onto the fabric. In conventional systems, patterns are generated by software, such as computer aided design (CAD) software. The different sizes of each given pattern piece (e.g., front pant, back pant, pocket, etc.) may be arranged into an arrangement of the pattern pieces over an area of fabric to be cut by a cutting machine. The arrangement of the pattern pieces may be referred to as a marker. After manufacturing, the patterns may be stored for future use. The stored pattern information may include multiple pattern points, such that the pattern may be recreated based on the stored pattern points. Pattern information may be stored according to industry standards in a format, such as AutoCAD. Of course, the pattern information may also be stored in a proprietary format.

Figure 1B:
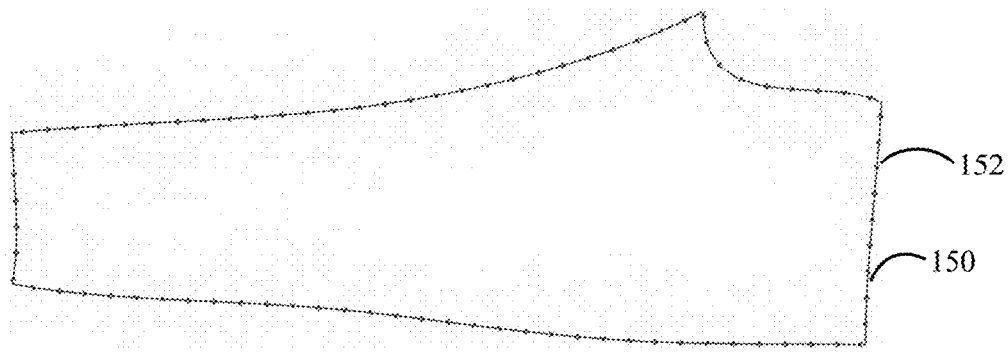
FIG. 1B illustrates an example of a pattern data according to aspects of the present disclosure.

FIG. 1B illustrates an example of a pattern 150 generated from stored pattern information (e.g., pattern data). As previously discussed, after generating a pattern 150, data pertaining to the pattern 150 may be electronically stored as pattern data. For example, the pattern data may be stored as an AutoCAD file. Each pattern in the stored pattern file includes a list of points 152 with x and y coordinates in real scale, and a description of a line (e.g., straight line or curved line) between adjacent points 152. By storing the pattern information in an electronic format, the pattern data may be shared with multiple manufacturers. The electronic format also permits designers to retrieve and/or modify patterns at a later date.

During a manufacturing process, a designer first generates a pattern for each piece of an item. When the designer is satisfied with the design, the patterns are stored as pattern data (see FIG. 1B) and sent to a manufacturer. The manufacturer receives the pattern data and a technical packet (e.g., "tech pack" or specification sheets). The tech pack is a set of documents created by a designer, tech-designer, pattern maker, or product developer that explain a design to a manufacturer, such that the manufacturer can create a desired product.

Figure 1C:
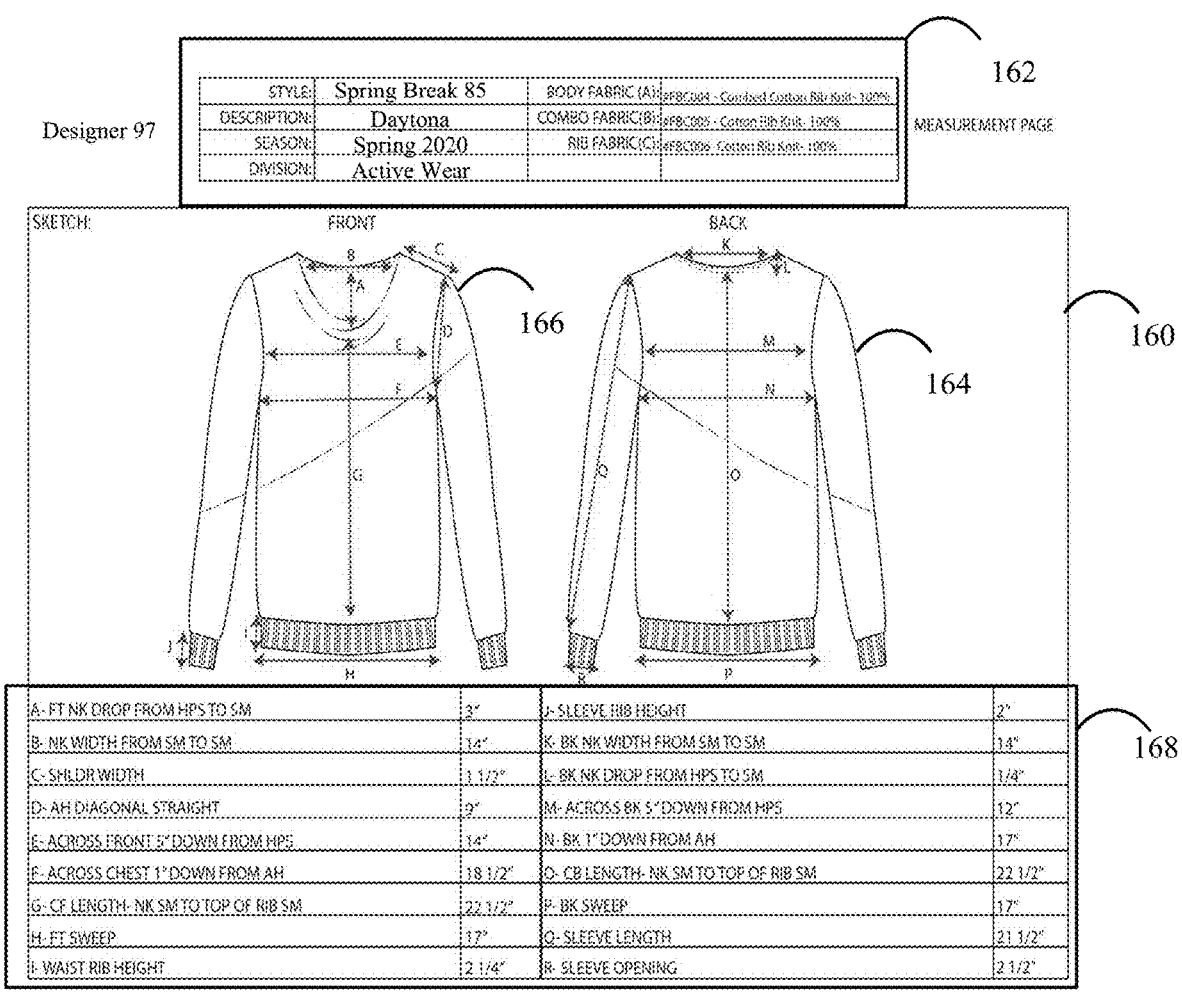
FIG. 1C illustrates an example of a tech pack according to aspects of the present disclosure.

The tech pack may include measurements, materials, combinations of materials, colors, trim, hardware, grading, labels, tags, etc. FIG. 1C illustrates an example of a tech pack 160 according to aspects of the present disclosure. As shown in FIG. 1C, the tech pack 160 includes a style section 162 that includes style information and fabric information. As shown in FIG. 1C, in this example, the style is "Spring Break 85," the description is "Daytona," and the season is "Spring 2020." This information may be stored in a database of the online search system. The stored information may be later used to retrieve pattern data or visual representations of patterns from a database of the online search system. For example, the user may enter the style (Spring Break 85) and description (Daytona) information into the search interface. Based on the user input, the online search system will use the information to obtain the stored pattern data, visual representation, or other information.

The tech pack 160 also includes a sketch section illustrating a front sketch 166 of the manufactured item and a back sketch 164 of the manufactured item. The front sketch 166 and back sketch 164 include measurement references that correspond to measurements in a measurement section 168. The measurements in the measurement section 168 may be referred to as the post-process specifications. The tech pack 160 of FIG. 1C is an example of a measurement page, the tech pack 160 is not limited to a measurement page and may include other information used to manufacture an item, such as cut direction, assembly instructions, sewing details, fabrics, materials, trims, suppliers for materials, artwork for prints, and packaging instructions.

The post-process specifications in the measurement section 168 are the final measurements for a post-process item. The post-process item is created by sewing the pattern pieces (e.g., pre-process patterns) together according to the tech pack 160 and then washing the sewn item. The washing process may cause the item to shrink. That is, each pattern piece may shrink at different areas based on a type of fabric, cut, sewing pattern, or other factors. To account for the shrinkage, designers provide pre-process pattern pieces with measurements that are greater than measurements (e.g., post-process specifications) in the measurement section 168.

To account for shrinkage during the manufacturing process, aspects of the present disclosure map the pre-process pattern pieces to the post-process pattern pieces based on post-process specifications. That is, the search system may receive pre-process pattern measurements from pattern data or from reversed measurements. Furthermore, the search system may receive the post-process specifications in a tech pack. In one configuration, the pre-process pattern measurements are approximated to a post-process pattern based on the post-process specifications in the tech pack. For example, if a waist size of a pre-process pattern is 36" and a waist size of the post-process pattern is 34", the pre-process pattern is adjusted based on the post-process waist measurement (e.g., specification).

In some cases, a tech pack does not include all post-process specifications. For example, the post-process specifications in the measurement section 168 of FIG. 1C do not include bicep measurements. Some customers may want to know whether a bicep fit of a search item matches a bicep fit of a reference item. As such, in one configuration, the search system includes a database of measurements that are not included in a tech pack. These measurements may be obtained from reverse measurements performed on post-process items. A machine learning model may learn the post-process measurements. By learning the post-process measurements, if a tech pack is missing one or more post-process specifications, the machine learning model may fill in missing measurements.

As an example, a tech pack may specify that a set of pants should have a 34" waist, a 30" inseam, and an 8" leg opening. In this example, to create the size specified in the tech pack, the pre-process cut pattern for pants may include the following measurements: waist (36"); inseam (32"); and a leg opening (10"). That is, after going through the production process (e.g., stitching, washing, etc.) the measurements from the pre-process cut patterns should equal the measurements specified in the tech pack. Still, the tech pack does not include other measurements similar to those discussed with regard to FIG. 5. For example, the tech pack may not specify measurements for the back low hip, back high hip, and front knee.

Aspects of the present disclosure obtain both the pre-process measurements and the post-process measurements. Thus, based on the given post-process measurements in a tech pack and pre-process measurements, the machine learning model may have learned the post-process measurements for other areas. For example, when a tech pack specifies that a set of pants should have a 34" waist, a 30" inseam, and an 8" leg opening and the pre-process cut pattern includes the following measurements: waist (36"); inseam (32"); and a leg opening (10"), the machine learning model may learn that the back low hip is approximately 14", the back high hip is approximately 8", and the front knee is approximately 6". Accordingly, aspects of the present disclosure adjust the pre-process pattern data in consideration of the changes caused by the production process. The aforementioned measurements are used for example purposes and may not be to scale. As such, aspects of the present disclosure are not limited to the aforementioned measurements.

Figure 1D:
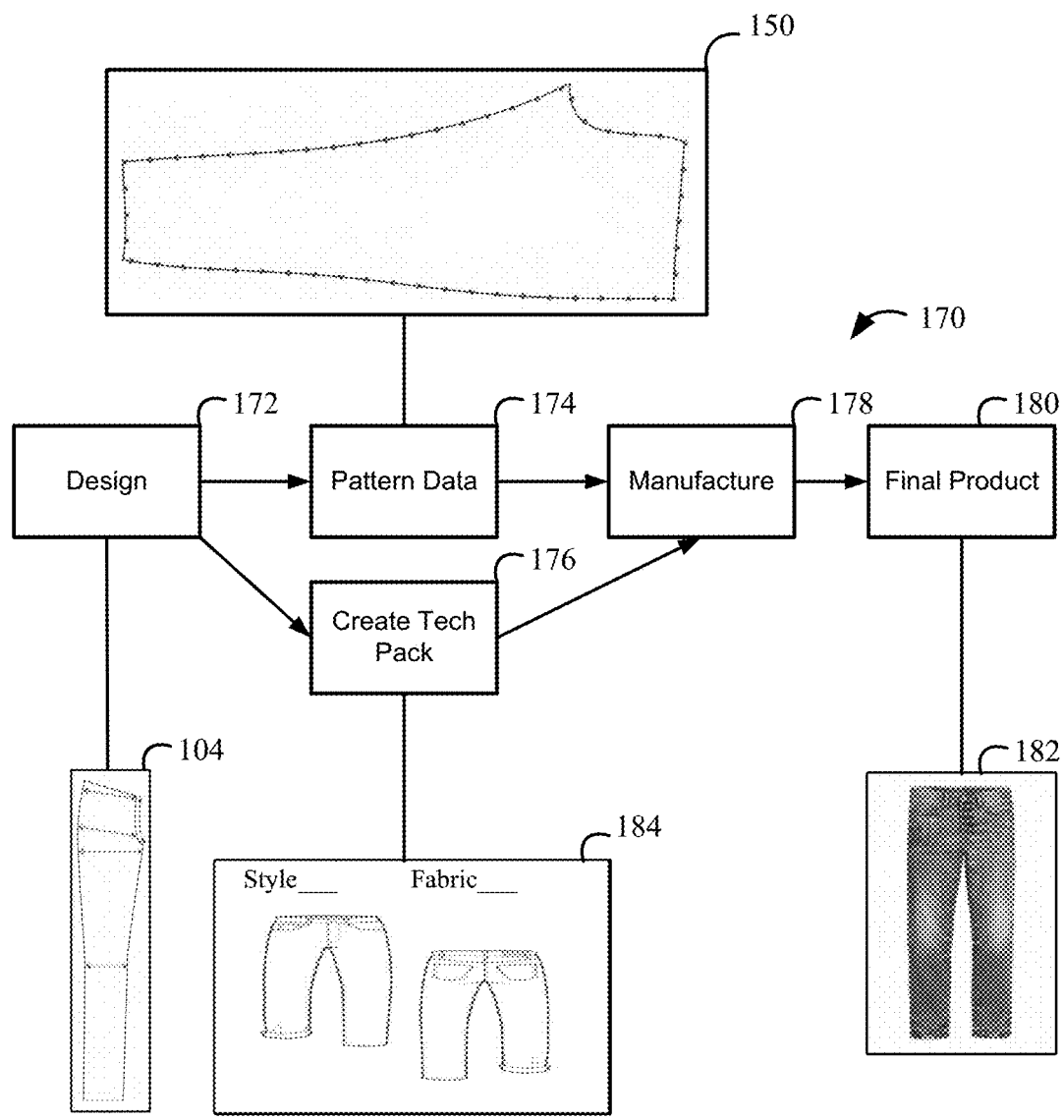
FIG. 1D illustrates an example of an apparel production process according to aspects of the present disclosure.

FIG. 1D illustrates an example of a manufacturing process 170 according to aspects of the present disclosure. As shown in FIG. 1D, at block 172, a designer designs an apparel item. As previously discussed, when designing an apparel item, the designer creates a cut pattern for each piece of the apparel item. For example, the designer creates a back pattern 104 for a back portion of one pant leg. The pattern pieces created during the design process at block 172 may be referred to as pre-process pattern pieces.

At block 174, the pre-process pattern pieces are stored as pattern data. As previously discussed, data pertaining to a pattern 150 (e.g., pre-process pattern) may be electronically stored as pattern data. For example, the pattern data may be stored as an AutoCAD file. Each pattern in the stored pattern file includes a list of points with x and y coordinates in real scale, and a description of a line (e.g., straight line or curved line) between adjacent points. At block 176, the designer also creates a tech pack 184 for the apparel item. As discussed above, the tech pack 184 is a set of documents that explains a design to a manufacturer, such that the manufacturer can create a desired product.

At block 178, after receiving the pattern data and the tech pack 184, a manufacturer may manufacture the product. The manufacturing process at block 178 includes cutting fabric based on the pattern data and assembling the cut pattern pieces according to the tech pack 184. The manufacturing process may also include washing the item after the pattern pieces have been sewn together. At block 180, a final product is created after the manufacturing process. In this example, the final product is jeans 182. As previously discussed, due to changes caused by the manufacturing process, the measurements of the jeans 182 may be different from the measurements of the pattern pieces. To account for the changes in measurements, aspects of the present disclosure adjust the pattern data according to specifications in the tech pack 184.

In one configuration, the pattern based system stores pattern data obtained from various designers and/or manufacturers. When a user searches for apparel, the pattern based system may search for matching patterns based on indexed pattern comparison data. In one configuration, for each item, pattern parts are compared piece by piece to pattern parts of similar items. The results of the comparisons may be indexed for later use. In this configuration, when the user searches for apparel, the pattern based system reviews the indexed pattern comparison data to find one or more matching patterns. Additional details of the search will be discussed below.

In comparison to measurements and sizes, patterns provide more information with regard to a fit of an item. For example, two different pants may have the same waist length (e.g., 34") and the same inseam length (e.g., 30"), however, the pants may have different fits due to being manufactured from different patterns. Additionally, different patterns may not be the only factor that cause different fits. Other factors, such as fabric type, fabric construction, and/or fabric color may affect the fit of an item.

For example, two items with the same pattern may have a different fit due to differences in fabric type. As one example, a rayon shirt and a cotton shirt with the same pattern may have a different fit. As another example, the apparel color may affect the fit. That is, fabrics may be dyed to a desired color by applying a dye solution and various chemicals. The fabric may be heated after applying the dye solution and chemicals. The dyeing process may alter various attributes of the fabric, such as the strength, elasticity, and size. Thus, two items with the same pattern may have different fits based on differences in color. For example, a dark blue jean and a light blue jean with the same pattern may have different fits due to the differences in color.

As another example, different fabrics may be constructed based on different techniques based on a manufacturer and/or type of fabric. In most cases, fabrics are made by weaving or knitting yarns. Alternatively, non-woven fabrics may be made by bonding or felting fibers together. A fabric's appearance, properties, and end use may be affected by the way it was constructed.

Generally, fabrics may be woven together based on a plan-weave, a twill-weave, or a satin-weave. In plan-weave fabric, a warp and weft are aligned to form a crisscross pattern. In twill-weave fabric, the crossings of weft and warp are offset to give a diagonal pattern on the fabric surface. Twill-weave is used in most jeans. In satin-weave fabric, the warp and weft threads are arranged to allow longer float threads either across the warp or the weft.

Alternatively, fabrics may be knitted based on a weft-knit or a warp-knit. Weft-knitted fabric is made by looping together long lengths of yarn. Generally, socks and t-shirts are weft-knitted. In warp-knitted fabric, the loops interlock vertically along the length of the fabric. Generally, swimwear and underwear are warp-knitted.

Furthermore, non-woven fabrics may be bonded or felted. Bonding refers to bonding fabrics together with heat or adhesives. Felting may be used for fabric from animal hair. For felting, the fabric may be matted together using moisture, heat, and/or pressure. As previously discussed, the construction (e.g., knitting, weaving, bonding, or felting) process used to manufacture the fabric may affect the fit of the apparel.

Conventional online shopping systems may be based on keywords, user profiles, measurement comparisons, and/or three-dimensional models. Conventional online shopping systems do not consider patterns, fabric type, fabric construction, and/or fabric color when providing search results or apparel suggestions.

For example, some conventional online shopping systems search for apparel based on keywords attributed to the apparel. For example, jeans may be attributed to keywords, such as low rise, skinny, tapered, slim, boot, and/or straight. Keyword searching may provide inaccurate results because different brands use different keywords for a same type of cut. For example, a slim fit shirt from a first brand may be referred to as a tapered fit shirt at a second brand. Additionally, different cuts from different brands may be associated to the same keyword. As an example, a straight cut from the first brand may be referred to as a classic cut at the second brand. Keyword based online shopping may result in a shopper buying apparel that does not fit properly.

As another example, some conventional online shopping systems maintain a user profile (e.g., shopper profile) that includes the user's shopping history, size preferences, brand preferences, and/or other information. The conventional online shopping system may recommend apparel based on the user's profile. For example, if a user purchased 34×30 slim fit jeans from brand A, the conventional system may recommend 34×30 slim fit jeans from brand B. Still, these conventional systems do not account for differences in fit between different brands, and/or differences in fit within the same brand, due to different patterns, fabric type, fabric construction, and/or fabric color as discussed above. Therefore, recommending apparel based on a user profile may still result in a user buying undesired apparel.

To improve on the shortcomings of using a user profile to suggest apparel, some conventional online shopping systems predict a fit level (e.g., how well an item will fit) of an item based on a comparison of the user's measurements to numerous measurements of an item. For example, these conventional systems may store measurements from specific points of each item in a database of items. In this example, for pants, the specific points may include the waist, hip, thigh, knee, calf, ankle, leg, crotch, and/or inseam. Additionally, these conventional systems may store each user's measurements in a database. For example, the user's measurements may include measurements of the hips, waist-to-knee, leg, crotch, calf, and/or ankle.

Based on a comparison of the stored user measurements and item measurements, the conventional system may recommend apparel that is within a user's desired size range. Although comparing stored user measurements to item measurements may provide more accurate results in comparison to previously discussed conventional systems, the aforementioned comparison does not account for different fits based on different patterns, fabric type, fabric construction, and/or fabric color as discussed above. Rather, comparing stored user measurements to item measurements is similar to the conventional in-person shopping technique of holding an item against one's body to determine whether the item will fit. As is known to those of skill in the art, this shopping technique is not accurate.

Furthermore, as more information is stored on remote servers, the number of data breaches has increased. Due to the possibility of a data breach, users may be uncomfortable with providing their measurements for remote storage. Additionally, due to human error, users may not provide accurate measurements, thereby compounding inaccuracies of a comparison between the stored user measurements and item measurements. Thus, conventional systems that compare stored user measurements and item measurements may also be undesirable to users that are concerned with privacy and may also be inaccurate due to errors in a user's measurements.

As discussed above, an item's measurements may not provide accurate results when determining whether an item will fit. To improve online shopping, some conventional online shopping systems use a data gathering device to obtain internal measurement data of different apparel items. For example, the data gathering device may obtain toe-box width, toe-box height, girth, internal length, and other related dimensions of a shoe. A three-dimensional (3D) model may be generated based on the internal measurement data.

After obtaining internal measurements for different apparel items, the conventional online shopping system may recommend items based on a comparison of the user's measurements and the stored internal measurements. As previously discussed, systems that rely on a user's measurements may be inaccurate due to human error that may occur when obtaining the user's measurements. Furthermore, given the number of different apparel items, the cost and time needed to obtain internal measurements of each apparel item renders this conventional online shopping system impractical.

Aspects of the present disclosure are directed to improving online shopping for apparel by using pattern data to recommend apparel to a shopper by providing visual feedback to compare a shopper's owned, or previously owned, apparel item to one or more apparel items found via an online search. In one configuration, in addition to pattern data, fabric type, fabric construction, and/or fabric color are used to recommend apparel. Aspects of the present disclosure improve a shopper's ability to find a correct apparel size when shopping for apparel online.

In the present disclosure, the correct apparel size refers to apparel with a desired fit and/or style for the shopper. That is, the correct apparel size is not limited to apparel with measurements that match the shopper's body measurements. Rather, the correct apparel size also refers to apparel with a desired fit, look, feel, etc. Furthermore, in the present disclosure, a user refers to a person that is shopping for clothing online. That is, the user refers to a person that is using an online portal (e.g., website) to shop for clothing. The online portal may be accessed via the user's phone, a computer, a kiosk, or any other type of device that provides access to a database and is capable of displaying results of a query. Accordingly, in the present disclosure, the term "shopper" may be used interchangeably with "user." Finally, an apparel item may also be referred to as an item or a wearable item. The apparel item refers to an item that may be worn, such as a shirt, dress, pants, shoes, socks, etc. Aspects of the present disclosure are not limited to any specific item and are contemplated for all apparel.

In one configuration, when searching for apparel, a user enters information for an owned, or previously owned, item that is similar to a type of item the user is interested in buying. For example, if the user is looking to buy jeans, the user may enter information about the user's jeans that had a correct fit. The information may include a brand name, style, item name, measurements, etc.

Figure 2:
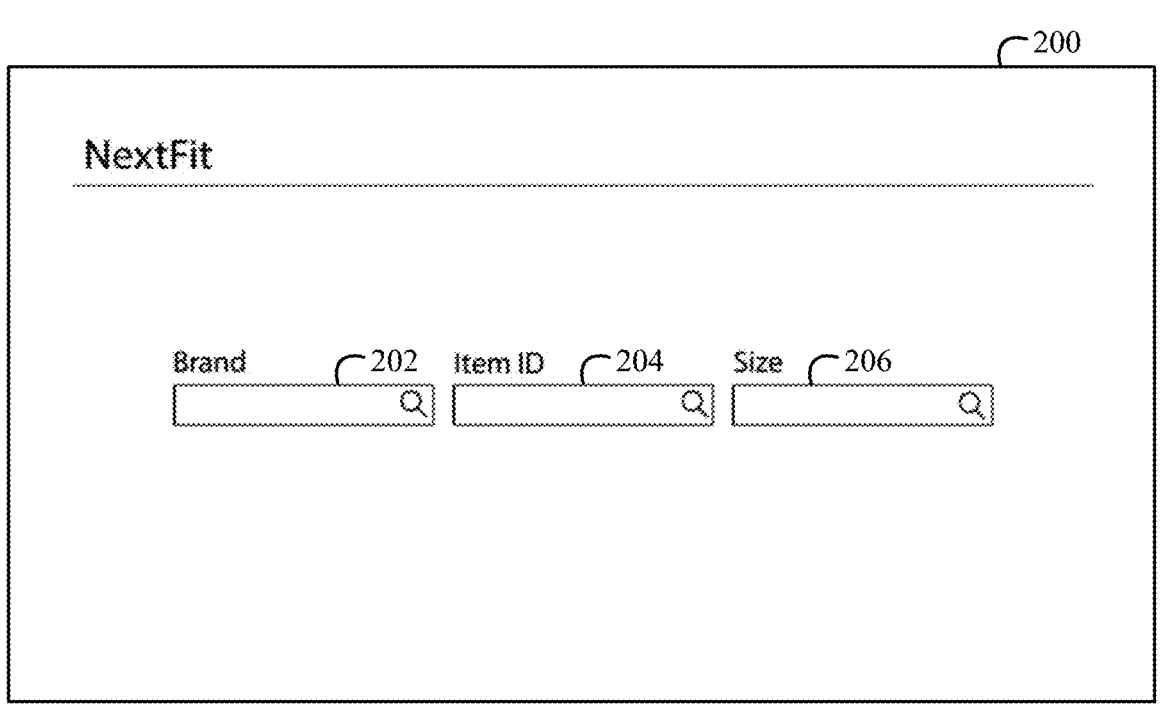
FIG. 2 illustrates an example of user interface (UI) for receiving information for a reference item according to aspects of the present disclosure.

FIG. 2 illustrates an example of user interface (UI) 200 for receiving information for a reference item according to aspects of the present disclosure. The reference item is an item having a correct fit for the user. The reference item may be owned by the user or may have been previously owned. Alternatively, the user may have tried on an item (e.g., tried the item on at a store) and determined that the item has a correct fit. As shown in FIG. 2, the user may input one or more of an item brand (e.g., Levis™) 202, an item name (e.g., 501 jeans), or code (e.g., item's registration number (RN)) 204, and/or the size of the item (e.g., waist, length, large, small, etc.) 206.

Of course, the information for the reference item is not limited to the information of FIG. 2 as other information may also be used, such as style name or item number. The information, such as item's RN, item number, and/or size may be obtained from the tags attached to the clothing. The information provided by the user may be used to query a database of patterns. The database may include patterns for apparel that is currently available in the market as well as previously available apparel, such as apparel that was available within a certain time period (e.g., the past five years).

The RN, or CA in Canada, refers to the manufacturer registration number on an apparel tag. In addition to the RN, manufacturers have an item number and/or a purchase order number usually noted on the same tag as the RN. The RN may specify the brand and the item number may specify an item within the brand. The RN and item number, together or individually, may provide sufficient information to track apparel. Some brands may use a style name in addition to, or instead of, an item number. For example, the style name may be Boyfriend, Graduate, or Brixton. Therefore, the style name may also be received as user input to find an item.

In one aspect of the disclosure, the online search system mobile application provides the ability for a user to scan a tag of a reference item. The tag may be scanned by capturing an image of the tag via a camera, such as the camera of the user's mobile device. The application may then upload the image of the tag to a server for further processing or perform the process on the device and the results of the processing are then sent to the server for the actual search to be performed. At the server, the image is parsed to identify item information, such as the RN, item number, size, style name, etc. The parsed information may be used to query a database of patterns. In one configuration, a link to a website for purchasing the item may be provided. The link may be determined from the parsed information.

In one configuration, after providing information for the reference item, the system confirms the item. For example, a confirmation screen may provide an item matching the information provided by the user. The confirmation screen may indicate a brand of the item (e.g., True Religion™), an item release date, an item color, an item fabric, a picture of the item, and/or other relevant information. The user may also be provided with an option to confirm whether the information is correct. In one configuration, if the information in the confirmation screen is not correct, the user may manually search through a list of items. Additionally, or alternatively, if the information in the confirmation screen is not correct, similar items may be shown and/or the user may be prompted to provide additional information.

After confirming that the item on the confirmation screen matches the reference item, the user may provide additional search parameters. In one configuration, the online shopping system does not provide a confirmation option and the user provides additional search parameters after providing the reference item information. The additional search parameters may include preferred sizes, such as preferred waist size, preferred inseam length, and/or preferred chest size. The user may also specify preferred colors and/or fabrics. Of course, the additional search parameters are not limited to the aforementioned parameters as other search parameters are also contemplated.

The search may be conducted to find items having a closest fit to the reference items. In one configuration, the closest fit is based on a pattern comparison. That is, the search compares one or more patterns of the search items to one or more patterns of the reference item(s). Search items may be presented to the user based on a matching score, such as a descending matching score of the match between patterns.

In one configuration, a schema of the pattern of the search item is displayed as an overlay on the pattern of the reference item(s). The overlaid patterns provide a visual comparison of the patterns so that a user may discern the fit of the items based on the reference item(s). In one configuration, the system transforms pattern data (see FIG. 1B) used by the clothing industry for production to a schematic version of the pattern. The schematic version of the pattern is suited for visual comparison between two patterns. The patterns for all indexed items and the schematic version of the patterns may be stored in a database associated with the search engine.

Figure 3:
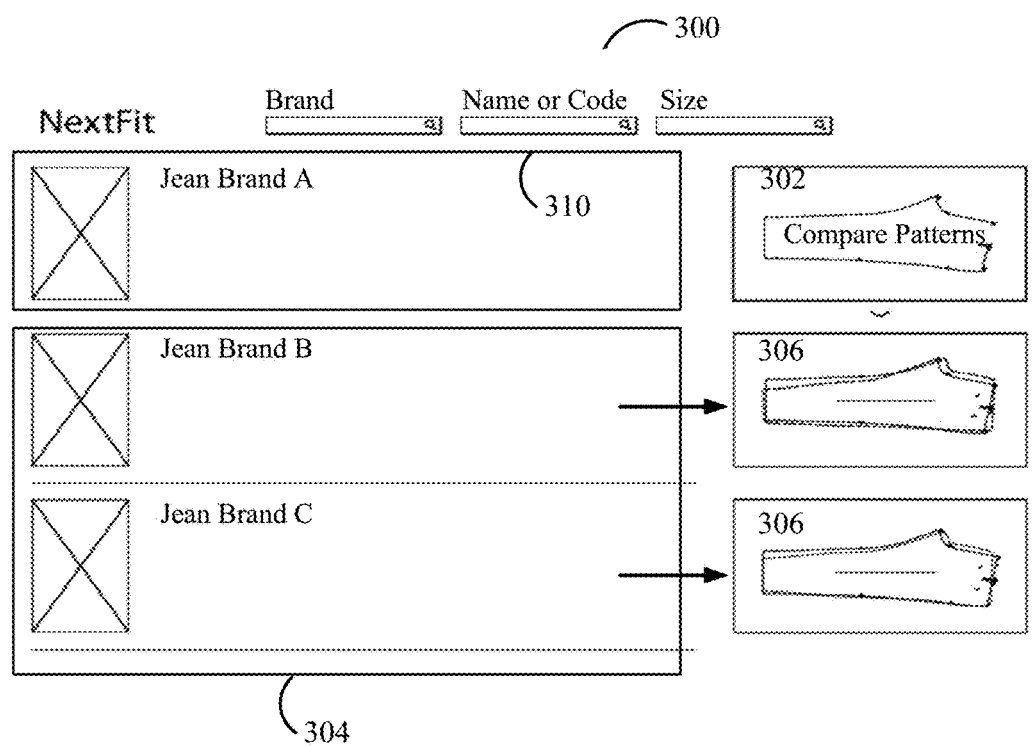
FIG. 3 illustrates an example of a search results screen according to aspects of the present disclosure.

FIG. 3 illustrates an example of a search results screen 300 according to aspects of the present disclosure. As shown in FIG. 3, a list of items matching the search criteria may be provided to the user. For example, the search results screen 300 may provide details and an image 302 of a pattern of a reference item 310. The search results screen 300 may also provide a list 304 of similar items. For each similar item, the search results screen 300 provides a comparison image 306 of a pattern of the similar item to the pattern of the reference item 310.

Figure 4A:
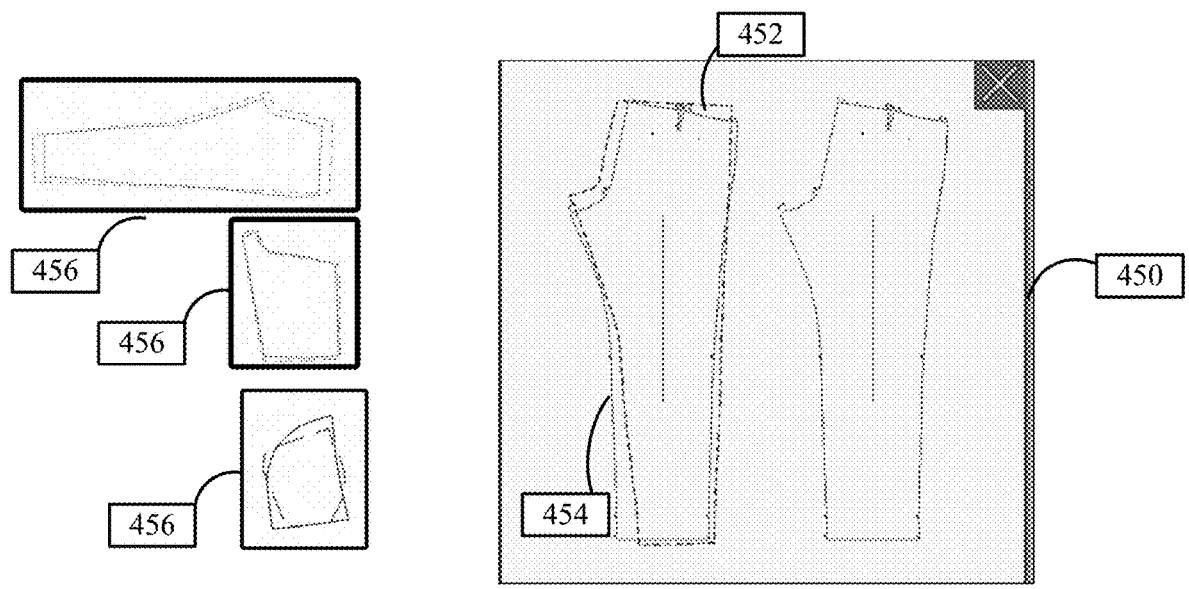
FIGS. 4A and 4B illustrate examples of a detailed pattern comparison according to aspects of the present disclosure.

The user may select an item from the search results screen 300 to open a detailed pattern comparison window. FIG. 4A illustrates an example of a detailed pattern comparison window 450 according to aspects of the present disclosure. As shown in FIG. 4A, the detailed pattern comparison window 450 displays a reference item pattern 452 overlaid on a selected item pattern 454. The selected item pattern 454 may also be concurrently displayed with no overlay.

As previously discussed, the detailed pattern comparison 450 may display one or more pattern part comparisons. In another example, the detailed pattern part comparison may only provide a comparison of one pattern part and the user may select a comparison of other pattern parts (e.g., back pattern, waist pattern, pocket pattern, etc.) via a menu. As shown in FIG. 4A, the user may select other pattern part comparisons 456. The selected other pattern part comparisons 456 may replace the detailed pattern comparison in the detailed pattern comparison window 450.

The position of the reference item pattern 452 overlaid on the selected item pattern 454 may be determined based on a minimum distance between the two patterns. As discussed below, the minimum distance may be determined based on a Fréchet measure. In one configuration, a user may move the reference item pattern 452 or the selected item pattern 454 for a comparison based on the user's preference. For example, the user may move the reference item pattern 452 or the selected item pattern 454 via user input on an input area of a device, such as a mobile device, laptop, tablet, etc.

The comparison may be an overlay of the pattern of the selected item and the pattern of the reference item. The user may infer the fit of the item based on the overlay of the pattern. The user may then select to purchase the item as desired. In addition to, or alternate from, providing a visual comparison of the patterns, aspects of the disclosure interpret the matching to provide a quantitative analysis. For example, the online shopping system may provide details, such as "tighter on the waist," "longer legs," or "wider leg openings."

Figure 4B:
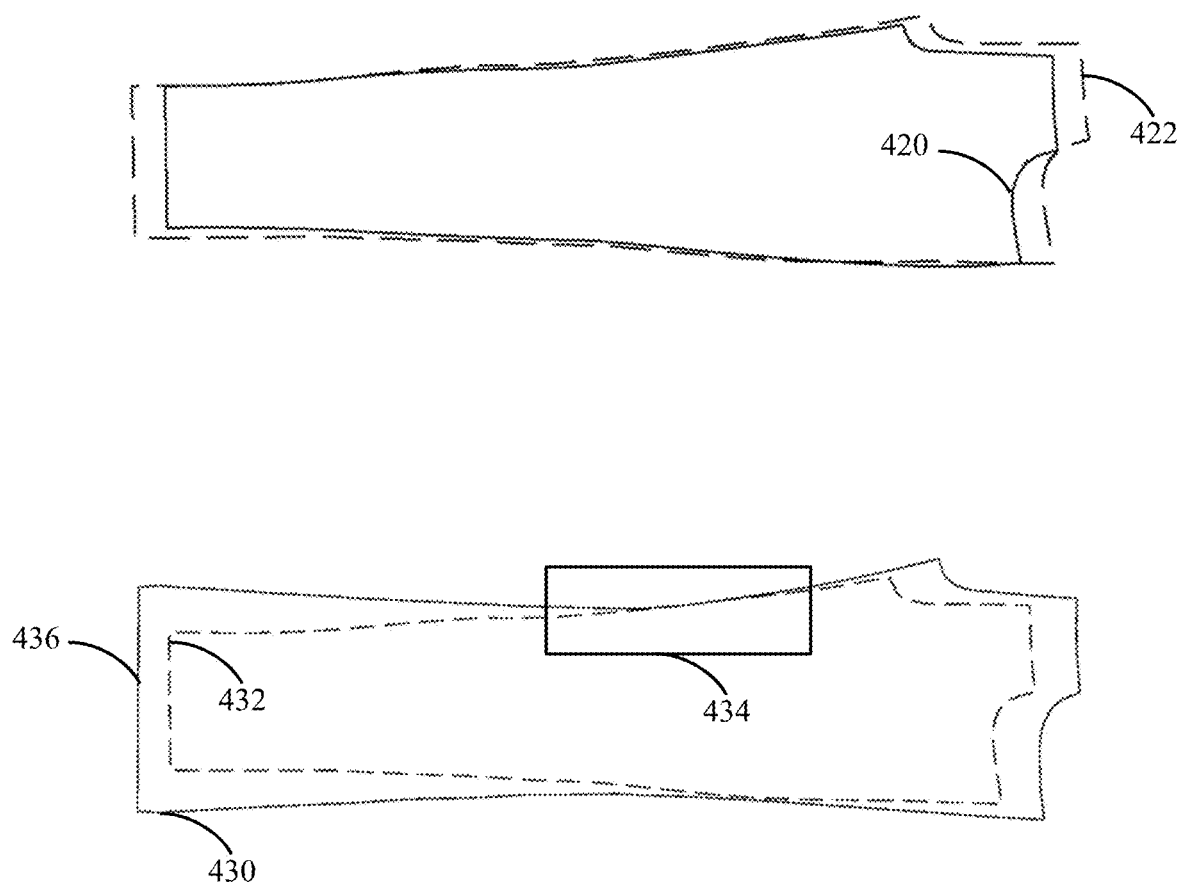

FIG. 4B provides another example of a detailed pattern comparison according to aspects of the present disclosure. The comparisons of FIG. 4B may be shown in a detailed pattern comparison window 450. As shown in FIG. 4B, a first reference item pattern 420 is compared to a first search item pattern 422. The first reference item pattern 420 comparison to the first search item pattern 422 may reveal that the two items have a similar cut pattern.

As shown in FIG. 4B, a second reference item pattern 430 is compared to a second search item pattern 432. In this example, there is a minimal distance between thigh areas 434 of the patterns 430, 432. Still, the second search item pattern 432 is shorter than the second reference item pattern 430. Additionally, the second reference item pattern 430 has a wider leg 436 opening in comparison to the second reference item pattern 430. In this example, the online shopping system may provide a natural language response of "tighter in the leg opening" or "shorter rise at the waist." As shown in FIG. 4B, the visualizations of the comparisons of the patterns 420, 422, 430, 432 assists a shopper in determining how well an item matches a reference item. Aspects of the present disclosure are not limited to comparing pant leg patterns and other patterns are contemplated.

In one configuration, during a search, the indexed pattern part comparisons are reviewed to determine similar items. TABLE 1 provides an example of an item comparison index according to aspects of the present disclosure. As shown in TABLE 1, a comparison score is indexed for each item known to the system (e.g., Jeans 1 to x). A known item is an item that has been previously measured or an item associated with pattern data. An item comparison index may be established for each item of the known items.

TABLE 1

| Item | Jean 1 | Jean 2 | Jean 3 | Jean 4 | ... | Jean x |
|---|---|---|---|---|---|---|
| Jean 1 |  | 0.9 | 0.5 | 0.2 | ... | 0.75 |
| Jean 2 | 0.9 |  | 0.2 | 0.6 | ... | 0.8 |
| Jean 3 | 0.5 | 0.2 |  | 1.0 | ... | 0.3 |
| Jean 4 | 0.2 | 0.6 | 1.0 |  | ... | 0.25 |
| ... |  |  |  |  |  |  |
| Jean x | 0.75 | 0.8 | 0.3 | 0.25 | ... |  |

In one configuration, a pattern part comparison index is also established for each pattern part of the known items. TABLE 2 provides a pattern part comparison index for comparing the front pattern piece of jeans.

TABLE 2

| Item | Jean 1 Front | Jean 2 Front | Jean 3 Front | Jean 4 Front | ... | Jean x Front |
|---|---|---|---|---|---|---|
| Jean 1 Front |  | 0.9 | 0.5 | 0.2 | ... | 0.75 |
| Jean 2 Front | 0.9 |  | 0.25 | 0.5 | ... | 0.7 |
| Jean 3 Front | 0.5 | 0.25 |  | 1.0 | ... | 0.2 |
| Jean 4 Front | 0.2 | 0.5 | 1.0 |  | ... | 0.35 |
| ... |  |  |  |  |  |  |
| Jean x Front | 0.75 | 0.7 | 0.2 | 0.3 | ... |  |

The search identifies pattern parts or items having a matching score that is greater than a threshold and a minimum distance between the pattern parts. For example, in TABLE 2, if Jean 1 is the reference item and the matching score threshold is 75% (e.g., 0.75), Jean 2 and Jean x may be considered the best match. The item matching score may be a cumulative score from matching scores of pattern pieces. When calculating the item matching score, the matching scores of pattern pieces may be weighed differently based on a user preference or a machine learning model. For example, the pattern part matching scores of TABLE 2 may be adjusted based on weights determined according to a user preference for an importance of a matching front part.

In another configuration, after identifying search items with a pattern part that is greater than the matching score threshold, the system searches the indexed matching scores of other pattern parts, such as waist, knee, leg opening, sleeve, etc., of the search items. Based on a search of the indexed matching scores of other pattern parts, the system may identify one or more similar items.

The similar items may be items having a greatest number of pattern parts with matching scores that are greater than a matching score threshold. In another configuration, the similar items may be items with specific pattern parts (e.g., waist, leg opening, knee) with matching scores that are greater than a matching score threshold. The system may provide a natural language response based on the pattern parts with a matching score that is greater than the matching score threshold. For example, a search item may be deemed similar to the reference item. Still, in this example, a matching score of a waist of the search item is less than a matching score threshold. Thus, the system may provide a natural language response of "looser in the waist." The system may also provide secondary interpretations such as "these jeans have bigger back pockets so your butt will look smaller."

The specific pattern parts may be identified by the user prior to a search. For example, the user may designate the waist and the knee as areas that should have the closest fit to the reference item. In addition to, or alternate from, user identified specific pattern parts, the specific pattern parts are determined based on a machine learning model. In this configuration, the machine learning model is trained to identify specific pattern parts that are important to users. Based on the training, the machine learning model may provide suggestions for specific pattern parts. In another example, the search is conducted without user input and based on specific pattern parts identified by the machine learning model.

In one configuration, the machine learning model is trained on user preferences. For example, for pants, users may want the waist and the knee to have the closest fit to the reference item. Thus, the machine learning model may learn that the waist and the knee are primary areas of focus when matching pants. As another example, for shirts, users may want the chest and sleeves to have the closest fit to the reference item. In this example, the machine learning model may learn that the chest and the sleeves are primary areas of focus when matching shirts. The machine learning model may be trained based on one or more of age, gender, region, clothing style (e.g., workout clothes, work clothes, etc.), user preferences, other factors, or a combination thereof.

According to aspects of the present disclosure, the matching threshold may be specific to pattern parts. Additionally, or alternatively, a user may specify the matching threshold. The user specific matching threshold may be based on natural language, such as "same," "looser," "tighter," etc. For example, when searching for jeans, the user may specify that they want jeans with a looser waist, same leg opening, and tighter thighs. Based on the user criteria, the matching threshold is adjusted for pattern parts corresponding to the areas identified by a user. In this example, if a pre-set matching threshold for the waist is 70%, the matching threshold may be reduced to 60%. Additionally, in this example, if a pre-set matching threshold for the thigh is 70%, the matching threshold may be increased to 80%. Of course, aspects of the present disclosure are not limited to the aforementioned matching threshold values.

In one configuration, a profile is generated for the user based on search items and/or search terms. The user profile may include inferred body measurements for each user. The inferred body measurements may be based on the reference item provided by the user during the search. The inferred measurement may be used to recommend fashion and clothing to the users via a communication medium (e.g., email) or when the user accesses a website associated with the online shopping system of the present disclosure. The user profile may include a list of items and corresponding sizes of the user. One or more items may not have a corresponding size if the user has not searched for similar items and/or if the user does not have a similar reference item. As an example, the user's shirt size is large and the user owns straight jeans. Based on the user profile, the system may provide a list of recommended items to the user.

Figure 5:
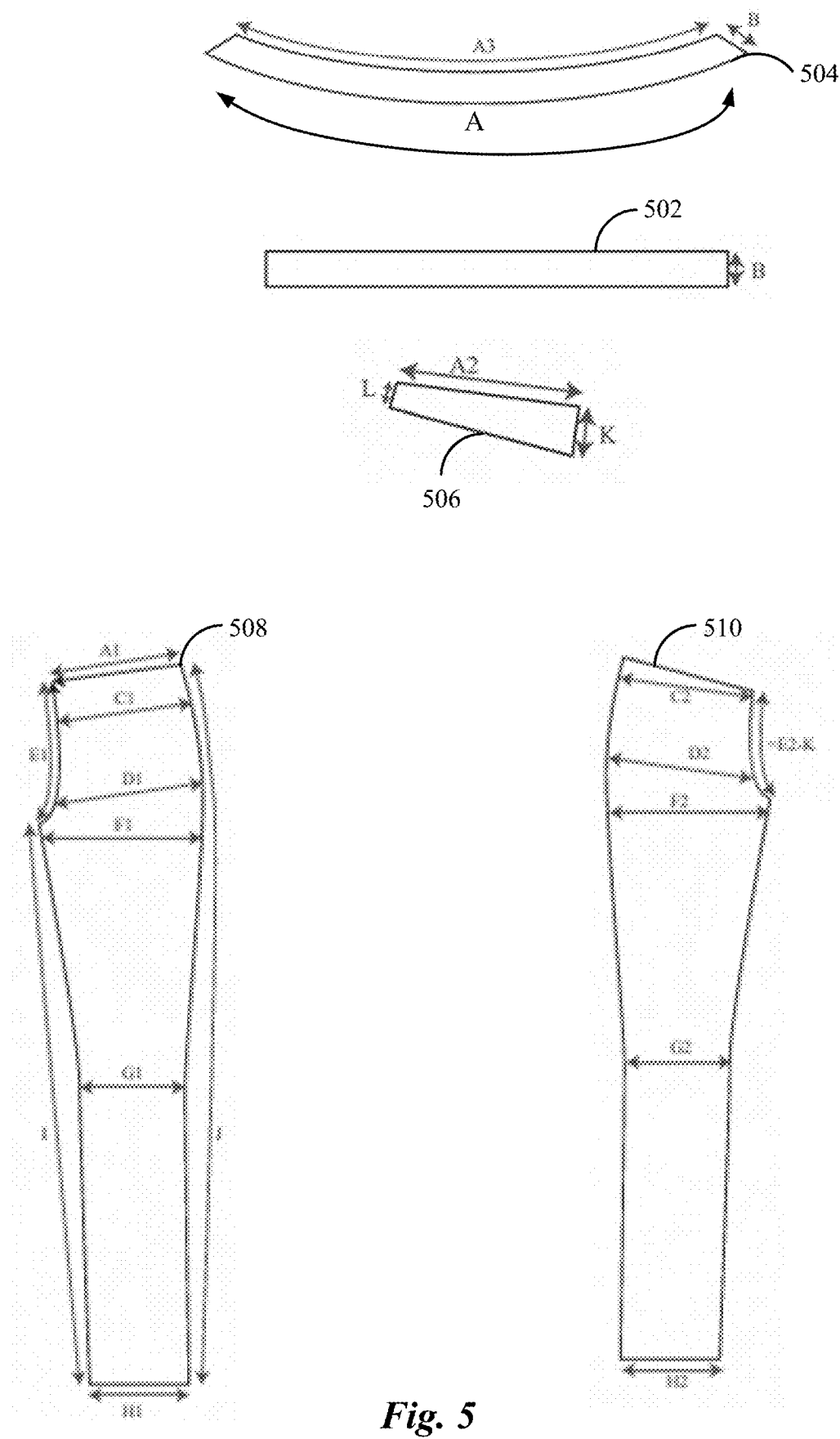
FIG. 5 illustrates an example of pattern measurements according to aspects of the present disclosure.

As previously discussed, pattern data may be used to reconstruct a pattern. In some cases, pattern data may not be available for an item. In this scenario, a pattern may be estimated by measuring different areas of an item. In one configuration, an item may be disassembled and each part of the disassembled item may be measured. FIG. 5 illustrates an example of measurements that may be performed on parts obtained by disassembling the pants. As shown in FIG. 5, the parts of the disassembled pants include a straight waistband 502 or a contoured waistband 504, a back yoke 506, a front 508, and a back 510. Generally, the straight waistband 502 is used for men's pants and the contoured waistband 504 is used for women's pants. Of course, pants may include more parts, such as crotch, coin holder, back pocket, and front pocket. The parts shown in FIG. 5 are for illustrative purposes and are not meant to limit aspects of the disclosure to only measuring the parts shown in FIG. 5.

In the example of FIG. 5, a waistband height (B), a top waist circumference (A3), and a bottom waist circumference (A) of the contoured waistband 504 may be measured. If the pants have a straight waist, the waistband height (B) of the straight waistband 502 is measured. For the back yoke 506, a back waist (A2), a back yoke height at an outseam (L) and a back yoke height at a center back (K) may be measured.

For the front 508, a front waist (A1), front high hip (C1), a front low hip (D1), front thigh (F1), a front knee (G1), a front leg opening (H1), a front rise not including a waistband (E1), lower front rise to leg opening (I), and waist to leg opening (J) are measured. For the back 510, a back high hip (C2), back low hip (D2), back thigh (F2), back knee (G2), back leg opening (H2), and a difference between the back rise not including a waistband (E2) and the back yoke height at the center back (K) may be measured. Aspects of the present disclosure are not limited to performing all of the listed measurements as all or some of the listed areas may be measured. Furthermore, additional areas that are not listed may be measured. An accuracy of a predicted pattern may increase as a number of measurements increases.

The measurements of different areas of an item may be performed by an owner of the item or an employee associated with the online shopping system. The item owner may upload the measurements to the online shopping system via a portal. Furthermore, the measurements may be performed by a device that performs measurements. For example, an item may be disassembled by hand or by a device. Once disassembled, different areas of the disassembled pieces may be measured by an autonomous measuring device or by a human.

In one configuration, a pattern is predicted based on one or more pictures of an item. For example, an owner of an item may take pictures of various portions of an item, such as a front side picture, backside picture, and side picture. The picture(s) may be uploaded to the online shopping system via a portal. In one configuration, the user may provide one or more measurements as a reference point. For example, the user may provide the inseam size and/or waist size. Based on the provided measurements, the online shopping system may then estimate other measurements, such as the measurements discussed with regard to the example of FIG. 5.

That is, if it is known that an inseam is 30", measurements of other areas of an item may be estimated based on their proportions in comparison to the inseam. For example, the known length of an area may be used to determine a pixels-per-metric value. The pixels-per-metric is a quotient of an object's measurement in pixels and a known measurement. For example, if the waist of a pant is 34", the pixels-per-metric may be calculated as follows: pixels-per-metric=object_width/34 inches. In this example, the pant width measured in pixels may be 1500 pixels wide. The number of pixels of a measurement may be determined based on an associated bounding box. The bounding box may be provided by an image classifier trained to identify different areas of apparel items. Accordingly, in this example, the pixels-per-metric=1500 pixels/34 inches=44.11, thus implying there are approximately 44.11 pixels per every 34 inches in the image of the present example. Using this ratio, the measurements of other areas of an item in the image may be obtained.

In one configuration, an image captured by a user is transformed to a desired perspective before estimating the measurements. For example, spatial transformation, such as an affine transformation, may be specified to scale, rotate, translate, or shear a set of points. As another example, a perspective transformation is performed. The transformations may be performed to improve the measurement estimation. Of course, the transformations are not limited to affine or perspective transformations as other transformations are also contemplated.

In another configuration, if measurements of an item are not available, a user may include a reference item with a known measurement in one or more of the uploaded photos. For example, the reference item may be a measuring stick or ruler. The known length of the reference item area may be used to determine a pixels-per-metric value. As discussed above, the pixels-per-metric value may be used to estimate measurements of an item. The one or more photos may also be captured with a camera at a facility associated with the online shopping system. In yet another configuration, measurements of an item may be estimated based on camera lens information and a distance of the camera lens from the object. After estimating the measurements of an item based on the image, the online shopping system may estimate the item's pattern. The estimated patterns may be stored in a database.

In one configuration, when a search is performed, the online shopping system may identify one or more items that may have a correct fit based on one or more patterns of a reference item. The correct fit may be estimated by comparing patterns of a search item with corresponding patterns of the reference item. The pattern comparison may determine an amount of similarity between the two patterns. In one configuration, a measure of similarity, such as Fréchet distance, Procrustes analysis, Hausdorff distance, dynamic time warping, or any combination thereof, is calculated to measure a similarity between areas of the two patterns. The similarity measurements are not limited to the aforementioned measurements of similarity as other measurements may be used to determine the amount of similarity between two patterns.

Figure 6A:
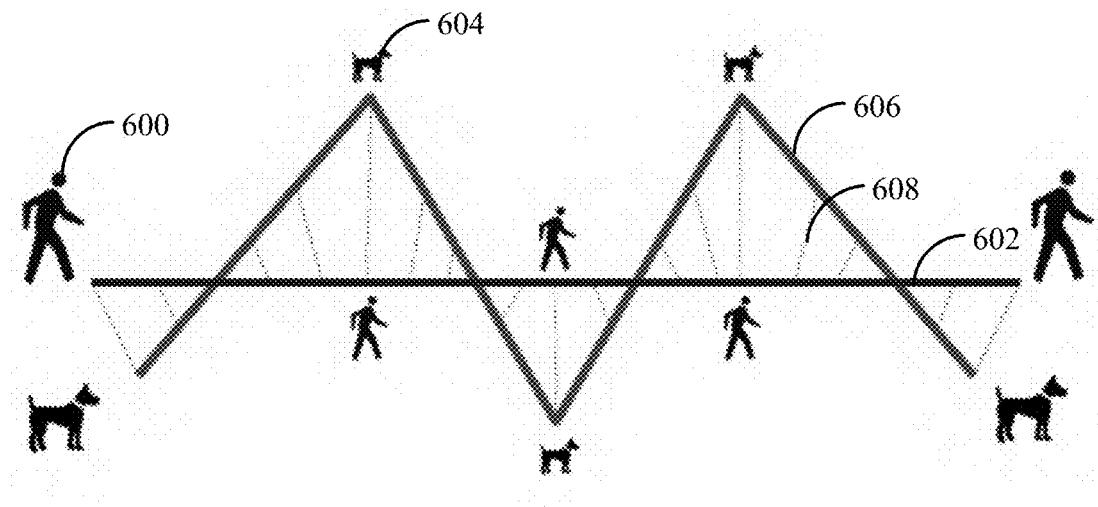
FIGS. 6A and 6B illustrate examples of distance measurements according to aspects of the present disclosure.

As is known to those of skill in the art, the Fréchet distance is often described using an analogy of a person and a dog on a leash continuously walking along two curves from a start to a finish, without backtracking. In this example, the Fréchet distance between these two curves is the minimum leash length that permits such a walk. FIG. 6A provides an example of the Fréchet distance. As shown in FIG. 6A, a human 600 walks along a first curve 602 and a dog 604 walks along a second curve 606. The dog 604 is attached to the human 600 via a leash 608. In this example, the Fréchet distance is a minimum leash length that permits the human 600 to walk along the first curve 602 and the dog 604 to walk along the second curve 606.

Figure 6B:
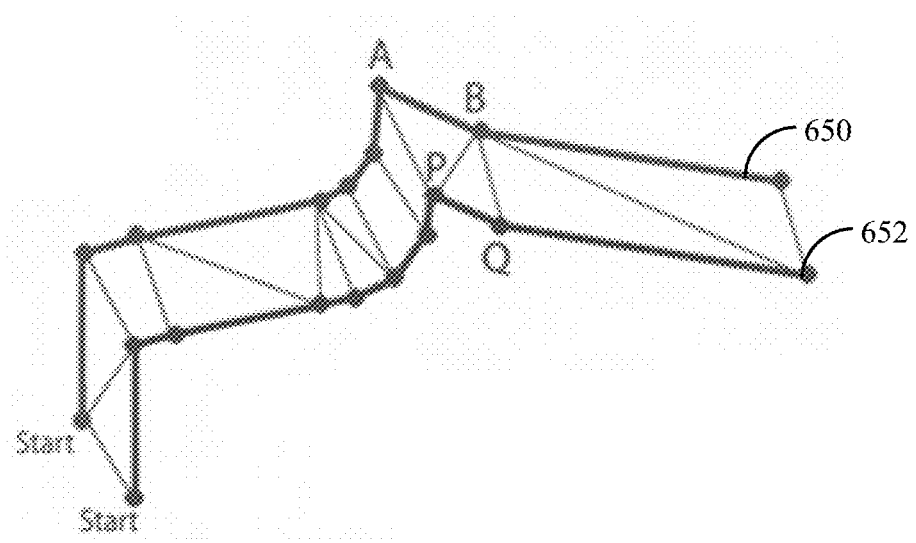

Aspects of the present disclosure use a discretized version of the Fréchet distance. Pattern data is piecewise linear. Therefore, the discretized version of the Fréchet distance considers piecewise linear curves. FIG. 6B illustrates an example of determining a discretized Fréchet distance between patterns according to aspects of the present disclosure. As shown in FIG. 6B, a first edge 650 of a pattern and a second edge 652 of a pattern may be compared. For brevity, FIG. 6B provides portions of edges 650, 652 of two patterns. In the example of FIG. 6B, a discretized Fréchet distance from the start to points (B, Q) may be calculated as follows: FD(B,Q)=min(max(FD(A,P), D(B,Q)), max(FD(A, Q), D(B,Q)), max(FD(B,P), D(B,Q))). Where FD(X,Y) is the Fréchet distance from the start to points X and Y, and D(X,Y) is the Euclidean distance between points X and Y. Conventional systems use the Fréchet distance to measure a distance between open polylines. Aspects of the present disclosure used the Fréchet distance (e.g., discretized Fréchet distance) in a novel manner for comparing closed shapes, such as cut patterns.

Figure 7:
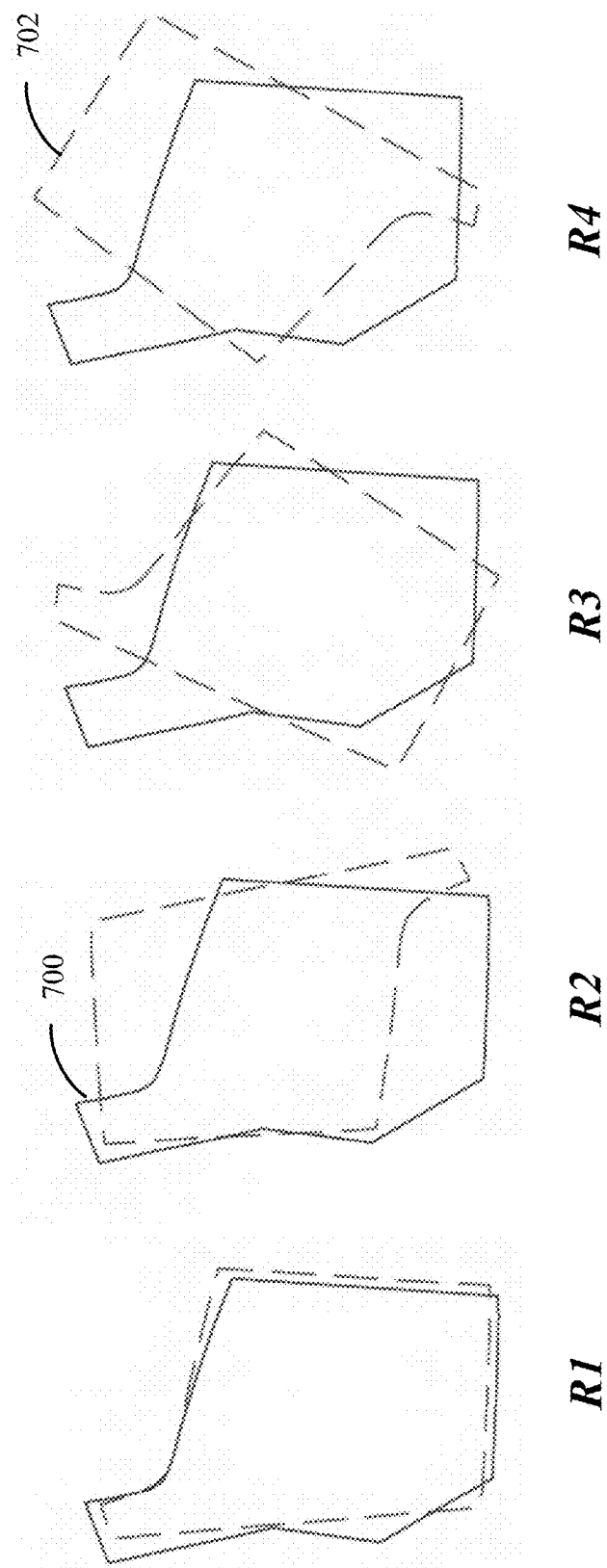
FIG. 7 illustrates an example of a matching function aligning a reference pattern piece to different rotations of a search pattern piece.

In one configuration, a matching function determines a closest alignment between pieces. That is, the matching function aligns each pattern piece of a reference item to a corresponding pattern piece of a searched item in all different alignment setups. FIG. 7 illustrates an example of a matching function aligning a reference pattern piece 700 to different rotations of a search pattern piece 702. As shown in FIG. 7, a matching function may try various rotations and translations (e.g., positioning) (R1-R4) of the search pattern piece 702. At each rotation and translation (R1-R4), the matching function compares the distance of the search pattern piece 702 and the reference pattern piece 700 based on the discretized Fréchet distance.

That is, the matching function compares data points and connections obtained from pattern data to calculate a distance (e.g., discretized Fréchet distance) between rotations and translations of the search pattern piece 702 and the reference pattern piece 700. The matching function selects the rotation and translation having a minimum distance (e.g., discretized Fréchet distance) between the search pattern piece 702 and the reference pattern piece 700. In this example, the matching function selects the first rotation and translation R1. After selecting the rotation and translation with the minimum distance between the pieces 700, 702, the system may render the pattern data to a pattern and display an overlay of the search pattern piece 702 on the reference pattern piece 700. The translation refers to the movement in horizontal and vertical directions.

The overlays of FIG. 7 are exemplary. Aspects of the present disclosure may not generate a rendering of a pattern piece 700, 702. Rather, the rendering may be generated after selecting the rotation and translation with the minimum distance between the pieces 700, 702. After determining a minimum distance between the pieces 700, 702, the distance is stored in a database (see TABLES 1 and 2). Rendering information, such as how the pieces should be rendered, may also be stored in a database for future use.

To improve a search speed, the search function may use heuristic pruning methods such as an A*-Search to search each pattern piece of a reference item against corresponding pattern pieces of subject items. In one configuration, the search includes comparing all rotations and alignments of a reference item against corresponding pattern pieces of subject items in a single search graph. In the A*-Search, a search graph may be where each node is a state of the system. In one configuration, each node is a result of matching the reference item against different items and different alignments. The A*-Search explores the graph node one-by-one with the lowest costing nodes first.

In one configuration, the search function is based on the pattern shapes of the garments. Additionally, the search function may consider post-production effects, such as dyeing, washing, heating and drying, etc., and apply the production effects on the cut patterns to predict the final post-processed patterns. That is, the shape of fabric may change due to different effects, such as washing. As such, the fit of an item may change during the life of the item. To improve an accuracy of the search, the pre-process patterns may be adjusted based on post-process pattern specifications. As previously discussed, based on measurements in a tech pack, measurement reversal techniques, and pattern data, a machine learning model may learn post-production effects (e.g., dyeing, washing, drying), and apply the post-production effects on the pre-process pattern measurements to predict the final post-process pattern measurements.

To obtain the measurements defined in a tech pack, various pre-process pattern lengths may be used until a desirable post-process pattern length is obtained. The trial-and-error approach for the manufacturing process may increase time and costs. In one configuration, the machine learning model that is used to predict the final post-process pattern measurements may be used in the manufacturing process. That is, by having the ability to apply the post-production effects on pre-process pattern measurements to predict the final post-process pattern measurements, a manufacturer may determine an appropriate pre-process pattern measurement to be obtained for a post-process pattern measurement specified in a tech pack. Thus, aspects of the present disclosure may also reduce manufacturing time and costs.

Figure 8:
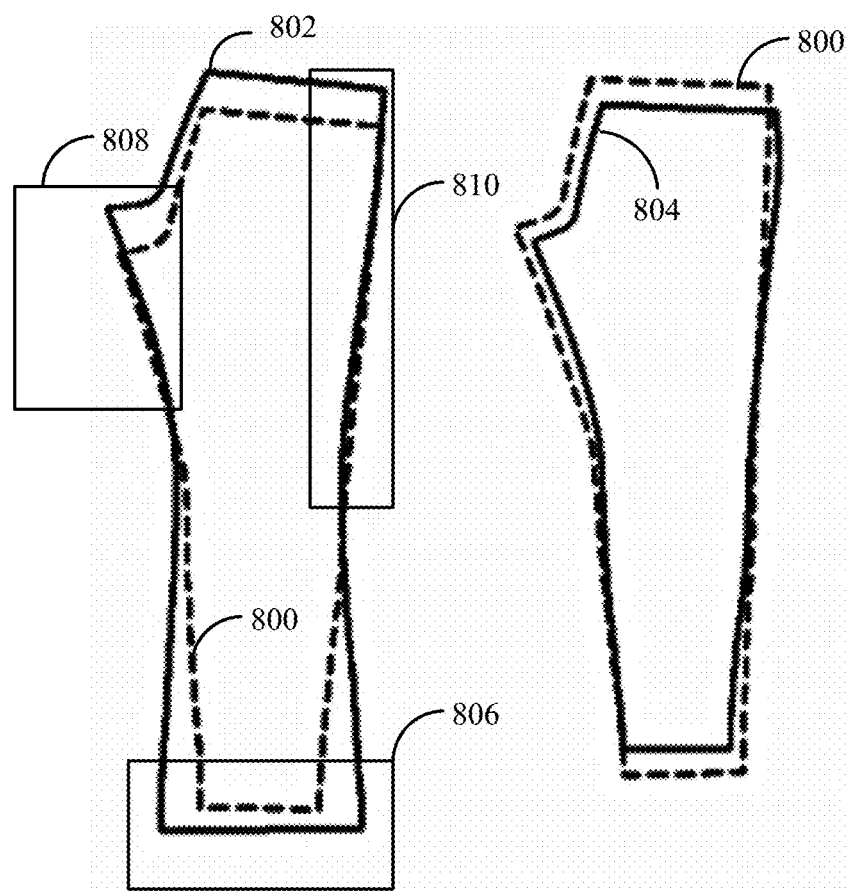
FIG. 8 illustrates an example of a comparison of different patterns according to aspects of the present disclosure.

FIG. 8 illustrates an example of a comparison of different patterns according to aspects of the present disclosure. As shown in FIG. 8, a reference item pattern 800 may be compared against a first search item pattern 802 and a second search item pattern 804. In this example, the reference item pattern 800 corresponds to part of a pattern from an item that a user has identified as having a correct fit. The first search item pattern 802 and the second search item pattern 804 correspond to parts of patterns of items found via a search based on reference item information. In this example, the reference item pattern 800, the first search item pattern 802, and the second search item pattern 804 are a front pattern for pants. Aspects of the disclosure are not limited to only comparing the front pattern for pants as other patterns may be compared. For example, when comparing pants, one or more of the front pattern, the back pattern, the waist pattern, and/or other patterns may be compared.

According to aspects of the present disclosure, when comparing multiple patterns of an item, different parts of the patterns may be given different weights. For example, the waist part of the pattern may be given more weight in comparison to a leg opening part. Thus, in this example, a mismatch in leg opening patterns may not affect a comparison score if there is a substantial match between waist patterns.

Furthermore, in one configuration, an entire area of one pattern is not compared to an entire area of another pattern. Rather, specific portions of a pattern may be compared. In another configuration, some portions of the pattern are given more weight than other portions. For example, as shown in FIG. 8, an entire area of the reference item pattern 800 is not compared to an entire area of the first search item pattern 802 and the second search item pattern 804. Rather, to reduce calculation time, specific areas are compared. For example, a similarity between the reference item pattern 800 and the first search item pattern 802 is determined at a first search area 806, a second search area 808, and a third search area 810. The similarity is determined between the reference item pattern 800 and all search result patterns at the designated search areas. The search areas may be different based on the pattern. That is, different search areas may be used for a front pant pattern, a back pant pattern, and a waist pattern. As discussed above, the similarity may be determined by calculating a Fréchet distance.

In another configuration, the first search area 806, the second search area 808, and the third search area 810 are given more weight than other areas of the patterns 800, 802. The weights may be based on user preferences, such as wider leg openings or more room in the back of the pants. Additionally, or alternatively, the weights may be based on a machine learning model that has learned areas that users find more important than others.

As previously discussed, different areas of a pattern may be given different weights. The different weights may be determined based on search criteria specified by the user. For example, the user may provide a reference item and preferences, such as tighter leg opening in comparison to the reference item, wider leg opening in comparison to the reference item, or do not care about leg opening. If the user does not care for a specific pattern piece, a weight for the pattern piece is reduced, such that a matching score of the pattern piece is not a large factor when determining whether two items have a similar fit. In another configuration, a machine learning model may be trained to focus on different areas of pattern pieces based on user interactions with the search system.

After determining the similarity, the online shopping system identifies one or more search items with patterns that have a similarity that is greater than a threshold to a reference item pattern 800. In the example of FIG. 8, the second search item pattern 804 is more similar to the reference item pattern 800 in comparison to the similarity between the first search item pattern 802 and the reference item pattern 800. Therefore, the search item corresponding to the second search item pattern 804 may be identified as the item that is most likely to have a correct fit.

Figure 9:
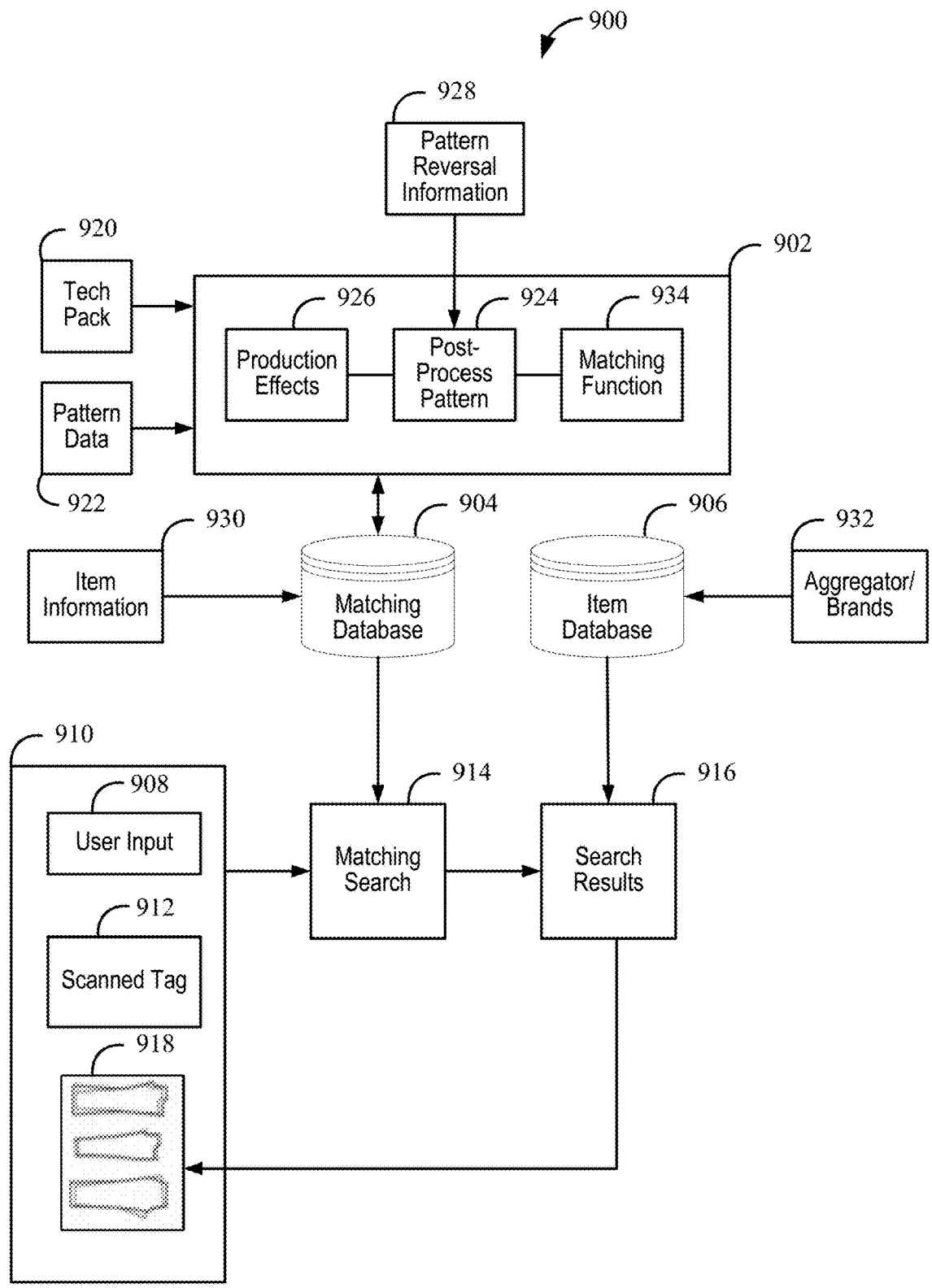
FIG. 9 illustrates an example of a system diagram for an online shopping system according to aspects of the present disclosure.

FIG. 9 illustrates an example of a system diagram of an online shopping system 900 according to aspects of the present disclosure. The online shopping system 900 may also be referred to as a search system. As shown in FIG. 9, for each item, data including a tech pack 920 and pattern data 922 (e.g., pre-process patterns) are processed at a pattern server 902 to determine a post-process pattern 924. The post-process pattern 924 is determined by considering production effects 926 applied to pattern data 922. The production effects 926 may be applied based on information received in the tech pack 920 and/or information obtained from a machine learning model (not shown) that has been trained on the differences of post-process patterns and pre-process patterns. Production effects 926 include effects during production such as washing, coloring, heating, and etching. The production effects 926 may also include changes caused by the one or more material used for the item.

In some cases, where the tech pack 920 and/or pattern data 922 is not available from the manufacturer, pattern reversal information 928 may be used to generate the post-process pattern 924. The pattern reversal information 928 may be uploaded to the pattern server 902 by an employee associated with the online shopping system 900 or a user that owns a specific item. The pattern reversal information 928 may include manual measurements or an image of the item. As previously discussed, various techniques may be used to obtain measurements from an image of an item.

A matching function 934 is used to determine a matching score between a post-process pattern 924 and known items stored in a matching database 904. The matching database 904 may also store matching scores (see TABLES 1 and 2) previously provided by the matching function 934. Once a new post-process pattern 924 is determined, the matching function 934 compares the post-process pattern 924 to similar patterns stored in the matching database 904. The matching scores and the post-process pattern 924 are then stored in the matching database 904. The matching database 904 may also store item information 930 for each item. The item information 930 may include one or more of a type of fabric, shrinkage information, stretch information, cut direction, and/or other information corresponding to an item.

The online shopping system 900 may also include an item database 906 that includes purchase information corresponding to items (e.g., post-process patterns 924) stored in the matching database 904. The purchase information may be obtained from a brand or an aggregator 932. The purchase information may include links to brand websites, e-commerce websites, fashion affiliate program sites, or other online sources. Additionally, or alternatively, the information in the item database 906 may be scraped from the Internet. The matching database 904 and the item database 906 may be different databases on a same server, such as the pattern server 902, different remotely located databases, or a same database.

The user initiates a search via a search platform 910. The search platform 910 may be a website accessible via a device, such as a mobile phone, a laptop, a tablet, or an in-store kiosk. The search platform 910 may receive user input 908 that includes information for a reference item. The information may include one or more of a brand name, style number, color, or other item information. Additionally, or alternatively, a user may provide a scanned tag 912 of a reference item and the search platform 910 obtains details from the information provided on the tag. When the reference item is identified, a matching search server 914 executes a search function to identify the closest item to the search item from the matching database 904 using the pre-determined search scores. The matching search server 914 may be the same hardware or different hardware from the pattern server 902. After identifying similar (e.g., matching) items, the search results 916 may be improved by retrieving additional information from the item database 906. For example, the search results 916 may be enhanced with other data such as a link to the similar item, item images, or other information.

The search results 916 may be output to a display 918 associated with the search platform 910. The search results 916 may include reference item patterns overlayed on patterns from the most similar matching items. As previously discussed, the search results 916 are linkable, such that the user may click on the items to land on the seller website. The results may also be provided via natural language, such as this item is: "tighter on the waist," "shorter," "has wider leg openings." The natural language results may be provided separate from the pattern overlay or in addition to the pattern overlay.

Moreover, the user may manually adjust the pattern alignments via a touch screen or a user input. The manual alignment may be similar to a user comparing two physical items in a store. Still, as previously discussed, comparing two physical items does not provide accurate results for a fit. Although physical items may have similar shapes, the nuances of cut patterns of the physical items are not discernable to a human. That is, because physical items are sewn together when put for sale in a store, a human cannot compare the cut patterns and other information (e.g., post-process information). That is, post-process patterns are not discernable to the human eye. Accordingly, an accurate fit cannot be discerned by a physical comparison of two physical items. The manual alignment of cut patterns displayed on a display 918 associated with the search platform 910 provides an improved fit analysis because users can determine nuances in cut patterns.

As such, aspects of the present disclosure provide a technical solution to a technical problem (e.g., finding proper fitting clothes online). Additionally, aspects of the present disclosure cannot be performed when a human is shopping in person at a store. Moreover, even if a human were to compare pre-process cut patterns, the human cannot process production effects to adjust the pre-process cut patterns. At best, the human shopper may physically try on each item to find the correct fit. Aspects of the present disclosure improve shopping time by mitigating the need to physically try on items while still providing a system of finding items corresponding to a desired fit.

Figure 10:
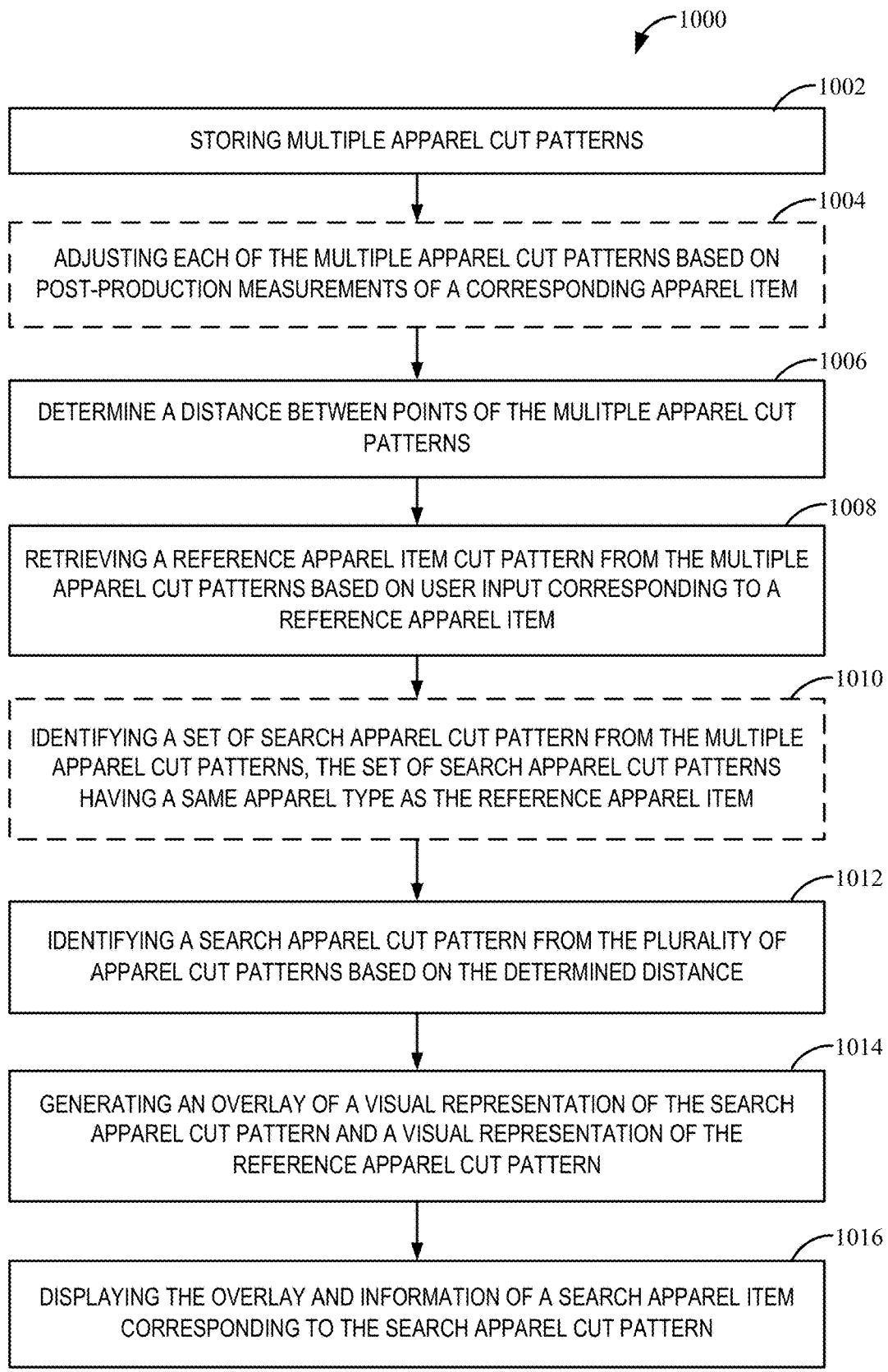
FIG. 10 illustrates an example of a flow diagram for online shopping according to aspects of the present disclosure.

FIG. 10 illustrates a flow diagram 1000 for searching for apparel online based on a visual comparison of cut patterns according to aspects of the present disclosure. As shown in FIG. 10, at block 1002 an online shopping system stores multiple apparel cut patterns. The apparel cut patterns may be obtained from a manufacturer or designer. After generating a pattern for each piece of an apparel item, data pertaining to the pattern may be electronically stored as pattern data. For example, the pattern data may be stored as an AutoCAD file. Each pattern in the stored pattern file includes a list of points with x and y coordinates and a description of a line (e.g., straight line or curved line) between adjacent points. In one configuration, the stored cut patterns are electronic pattern data.

In an optional configuration, at block 1004, the online shopping system adjusts each of the multiple apparel cut patterns based on post-production measurements of a corresponding apparel item. As discussed above, during production, the measurements of patterns may be changed due to production effects. The production effects include washing, coloring, heating, and etching. Based on information from tech packs and/or information obtained from a machine learning model, the multiple apparel cut patterns may be adjusted to account for production effects. The adjusting may improve the accuracy of a comparison of a search apparel item cut pattern to a reference apparel item cut pattern.

At block 1006, the online shopping system determines a distance between points of the multiple apparel cut patterns. The distance may be a similarity measurement, such as Fréchet distance or Hausdorff distance. Similarity measurements take two patterns and calculate a similarity measurement (e.g., distance measurement). In one configuration, the similarity measurements between different patterns (e.g., parts) of known apparel items are stored in a database. For example, upon receiving the patterns of an item, a similarity measurement is calculated for a pattern of each part (e.g., front, back, yoke, etc.) and a pattern of each part of known similar items. The similarity measurements are then stored for later use. Upon receiving a query, items may be retrieved based on the pre-determined similarity measurements. The database may store a total distance measurement and also distance measurements between individual pattern pieces.

At block 1008, the online shopping system retrieves a reference apparel item cut pattern from the multiple apparel cut patterns based on user input corresponding to a reference apparel item. That is, a user may initiate a search via a search platform. The search platform may be website accessible via a device, such as a mobile phone, a laptop, a tablet, or an in-store kiosk. The search platform may receive user input that includes information for a reference item. The information may include one or more of a brand name, style number, color, or other item information. Additionally, or alternatively, a user may provide a scanned tag of a reference item and the search platform obtains details from the information provided on the tag. The online shopping system identifies the reference apparel item based on the user input. The online shopping system retrieves a stored reference apparel item cut pattern corresponding to the reference apparel item.

At block 1010, in an optional configuration, upon identifying the reference apparel item cut pattern, the online shopping system identifies a set of search apparel cut patterns from the multiple apparel cut patterns, the set of search apparel cut patterns having a same apparel type as the reference apparel item. For example, if the reference apparel item is a women's blouse, the online shopping system identifies the set of search apparel cut patterns corresponding to women's blouses. At block 1012, the online shopping system identifies a search apparel cut pattern from the multiple apparel cut patterns based on the determined distance. As previously discussed, the online shopping system determines a distance measurement between patterns. In one configuration, after identifying the reference apparel item cut pattern, the online shopping system identifies the search apparel cut pattern with the minimal distance measurement from the reference apparel cut pattern.

At block 1014, after identifying the search apparel cut pattern, the online shopping system generates an overlay of a visual representation of the search apparel cut pattern and a visual representation of the reference apparel cut pattern. The overlay provides the user with a visual comparison of the two patterns. As previously discussed, in conventional online shopping systems, users cannot compare cut patterns. At best, a user may compare measurements of two items. Still, measurements do not provide an accurate comparison of items because measurements are based on the external representation of an apparel item. A more accurate fit may be determined by comparing the cut pattern, which is the basis of the external representation of the apparel item. Furthermore, even when a user is shopping in a store, the user cannot compare cut patterns. Accordingly, aspects of the present disclosure provide an overlay that is not available when a user is shopping either online or in-person. That is, aspects of the present disclosure create a new data type that improves a user's ability to find proper fitting clothing.

At block 1016, the online shopping system displays the overlay and information of a search apparel item corresponding to the search apparel cut pattern. For example, the online shopping system may provide a link to purchase the search apparel item.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for searching for apparel online based on a visual comparison of cut patterns, comprising:
    storing a plurality of apparel cut patterns, each apparel cut pattern corresponding to an apparel item and applied when cutting fabric for the apparel item;
    determining a similarity measurement between apparel cut patterns in a set of apparel cut patterns based on a distance between points of the apparel cut patterns in the set of apparel cut patterns, the set of apparel cut patterns selected from the plurality of apparel cut patterns, the set of apparel cut patterns corresponding to a same type of apparel item;
    retrieving a reference apparel item cut pattern from the plurality of apparel cut patterns based on user input corresponding to a reference apparel item;
    identifying a search apparel cut pattern from the set of apparel cut patterns corresponding to an apparel type of the reference apparel item, the search apparel item identified based on the similarity measurement;
    generating an overlay of a visual representation of the search apparel cut pattern and a visual representation of the reference apparel cut pattern; and
    displaying the overlay and information of a search apparel item corresponding to the search apparel cut pattern.

2. The method of claim 1, in which identifying the search apparel cut pattern comprises:
    identifying the set of apparel cut patterns corresponding to the apparel type of the reference apparel item; and
    identifying the search apparel cut pattern from the set of apparel cut patterns based on the similarity measurement between the search apparel cut pattern and the reference apparel item cut pattern.

3. The method of claim 1, in which the plurality of apparel cut patterns comprise sewing pattern data.

4. The method of claim 1, further comprising adjusting each of the plurality of apparel cut patterns based on post-production measurements of a corresponding apparel item.

5. The method of claim 1, in which generating the overlay comprises:
    determining a minimum distance between a rotation and a translation of the reference apparel cut pattern and a rotation and a translation of the search apparel cut pattern; and
    rendering the visual representation of the search apparel cut pattern and the visual representation of the reference apparel cut pattern based on the minimum distance.

6. The method of claim 1, further comprising providing, via the displayed information, a link to an online store for purchasing the search apparel item.

7. An apparatus for searching for apparel online based on a visual comparison of cut patterns, the apparatus comprising:
    a memory; and
    at least one processor coupled to the memory, the at least one processor configured:
        to store a plurality of apparel cut patterns, each apparel cut pattern corresponding to an apparel item and applied when cutting fabric for the apparel item;
        to determine similarity measurement between apparel cut patterns in a set of apparel cut patterns based on a distance between points of the apparel cut patterns in the set of apparel cut patterns, the set of apparel cut patterns selected from the plurality of apparel cut patterns, the set of apparel cut patterns corresponding to a same type of apparel item;
        to retrieve a reference apparel item cut pattern from the plurality of apparel cut patterns based on user input corresponding to a reference apparel item;
        to identify a search apparel cut pattern from the set of apparel cut patterns corresponding to an apparel type of the reference apparel item, the search apparel item identified based on the similarity measurement;
        to generate an overlay of a visual representation of the search apparel cut pattern and a visual representation of the reference apparel cut pattern; and
        to display the overlay and information of a search apparel item corresponding to the search apparel cut pattern.

8. The apparatus of claim 7, in which at least one processor is configured to identify the search apparel cut pattern by:
    identifying the set of apparel cut patterns corresponding to the apparel type of the reference apparel item; and
    identifying the search apparel cut pattern from the set of apparel cut patterns based on the similarity measurement between the search apparel cut pattern and the reference apparel item cut pattern.

9. The apparatus of claim 7, in which the plurality of apparel cut patterns comprise sewing pattern data.

10. The apparatus of claim 7, in which at least one processor is further configured to adjust each of the plurality of apparel cut patterns based on post-production measurements of a corresponding apparel item.

11. The apparatus of claim 7, in which at least one processor is further configured to generate the overlay by:
   determining a minimum distance between a rotation and a translation of the reference apparel cut pattern and a rotation and a translation of the search apparel cut pattern; and
   rendering the visual representation of the search apparel cut pattern and the visual representation of the reference apparel cut pattern based on the minimum distance.

12. The apparatus of claim 7, in which at least one processor is further configured to provide a link, via the displayed information, to an online store for purchasing the search apparel item.

13. A non-transitory computer-readable medium having program code recorded thereon for searching for apparel online based on a visual comparison of cut patterns, the program code executed by a processor and comprising:
   program code to store a plurality of apparel cut patterns, each apparel cut pattern corresponding to an apparel item and applied when cutting fabric for the apparel item;
   program code to determine similarity measurement between apparel cut patterns in a set of apparel cut patterns based on a distance between points of the apparel cut patterns in the set of apparel cut patterns, the set of apparel cut patterns selected from the plurality of apparel cut patterns, the set of apparel cut patterns corresponding to a same type of apparel item;
   program code to retrieve a reference apparel item cut pattern from the plurality of apparel cut patterns based on user input corresponding to a reference apparel item;
   program code to identify a search apparel cut pattern from the set of apparel cut patterns corresponding to an apparel type of the reference apparel item, the search apparel item identified based on the similarity measurement;
   program code to generate an overlay of a visual representation of the search apparel cut pattern and a visual representation of the reference apparel cut pattern; and
   program code to display the overlay and information of a search apparel item corresponding to the search apparel cut pattern.

14. The non-transitory computer-readable medium of claim 13, in which program code to identify the search apparel cut pattern comprises:
   program code to identify the set of apparel cut patterns corresponding to the apparel type of the reference apparel item; and
   program code to identify the search apparel cut pattern from the set of apparel cut patterns based on the similarity measurement between the search apparel cut pattern and the reference apparel item cut pattern.

15. The non-transitory computer-readable medium of claim 13, in which the plurality of apparel cut patterns comprise sewing pattern data.

16. The non-transitory computer-readable medium of claim 13, in which the program code further comprises program code to adjust each of the plurality of apparel cut patterns based on post-production measurements of a corresponding apparel item.

17. The non-transitory computer-readable medium of claim 13, in which the program code further comprises program code to generate the overlay further comprises:
   program code to determine a minimum distance between a rotation and a translation of the reference apparel cut pattern and a rotation and a translation of the search apparel cut pattern; and
   program code to render the visual representation of the search apparel cut pattern and the visual representation of the reference apparel cut pattern based on the minimum distance.

18. The non-transitory computer-readable medium of claim 13, in which the program code further comprises program code to provide a link, via the displayed information, to an online store for purchasing the search apparel item.

* * * * *